(12) United States Patent
Waggoner et al.

(10) Patent No.: US 12,145,114 B2
(45) Date of Patent: Nov. 19, 2024

(54) ADJUSTABLE ADDITIVE DELIVERY SYSTEMS AND METHODS

(71) Applicant: Cirkul, Inc., Tampa, FL (US)

(72) Inventors: Garrett S. Waggoner, Tampa, FL (US); Andrew Gay, Mill Creek, WA (US); Thomas A. Urbanik, Watertown, MA (US); William G. Kurth, Dunbarton, NH (US); Daniel J. Faulkner, Portland, OR (US); Drew Kissinger, Carlisle, MA (US)

(73) Assignee: Cirkul, Inc., Tampa, FL (US)

( * ) Notice: Subject to any disclaimer, the term of this patent is extended or adjusted under 35 U.S.C. 154(b) by 0 days.

(21) Appl. No.: 17/884,553

(22) Filed: Aug. 9, 2022

(65) Prior Publication Data

US 2023/0084794 A1 Mar. 16, 2023

Related U.S. Application Data

(60) Continuation of application No. 17/146,463, filed on Jan. 11, 2021, and a continuation of application No.
(Continued)

(51) Int. Cl.
*A47J 31/00* (2006.01)
*A47J 41/00* (2006.01)
(Continued)

(52) U.S. Cl.
CPC .......... *B01F 23/451* (2022.01); *A47J 31/005* (2013.01); *A47J 41/0083* (2013.01); *A47J 43/27* (2013.01);
(Continued)

(58) Field of Classification Search
CPC .............................. A47J 31/005; B65D 47/06
See application file for complete search history.

(56) References Cited

U.S. PATENT DOCUMENTS

| 715,425 A | 12/1902 | Schamp |
|---|---|---|
| 933,464 A | 9/1909 | Kasjens |

(Continued)

FOREIGN PATENT DOCUMENTS

| AU | 2017228456 A1 | 8/2018 |
|---|---|---|
| AU | 2018225178 A1 | 9/2019 |

(Continued)

OTHER PUBLICATIONS

International Search Report and Written Opinion mailed May 7, 2021 in connection with International Application No. PCT/US2020/062521.

(Continued)

*Primary Examiner* — David L Sorkin
(74) *Attorney, Agent, or Firm* — Wolf, Greenfield & Sacks, P.C.

(57) ABSTRACT

An additive delivery system may incorporate a cartridge system, including a container cap and a reservoir assembly that provides for storage of an additive. The container cap includes a mixing nozzle for mixing of the additive with a base fluid as the base fluid flows from the base fluid container through the cartridge. A one-way valve prevents backflow of base fluid and/or mixed base fluid/additive from an area downstream of the mixing nozzle such that the base fluid supply remains in a pure state.

22 Claims, 16 Drawing Sheets

Related U.S. Application Data

16/679,060, filed on Nov. 8, 2019, now Pat. No. 11,406,946, said application No. 17/146,463 is a continuation of application No. 15/451,384, filed on Mar. 6, 2017, now Pat. No. 10,888,826, said application No. 16/679,060 is a division of application No. 15/451,384, filed on Mar. 6, 2017, now Pat. No. 10,888,826, which is a continuation-in-part of application No. 15/358,087, filed on Nov. 21, 2016, now Pat. No. 11,583,811, which is a continuation of application No. 14/948,225, filed on Nov. 20, 2015, now Pat. No. 9,498,086.

(60) Provisional application No. 62/363,177, filed on Jul. 15, 2016, provisional application No. 62/303,376, filed on Mar. 4, 2016, provisional application No. 62/083,129, filed on Nov. 21, 2014.

(51) Int. Cl.
| | |
|---|---|
| A47J 43/27 | (2006.01) |
| B01F 23/451 | (2022.01) |
| B01F 25/314 | (2022.01) |
| B01F 25/315 | (2022.01) |
| B01F 33/501 | (2022.01) |
| B01F 35/71 | (2022.01) |
| B65D 47/06 | (2006.01) |
| B65D 47/24 | (2006.01) |
| B65D 81/32 | (2006.01) |
| B01F 23/40 | (2022.01) |

(52) U.S. Cl.
CPC ...... *B01F 25/31433* (2022.01); *B01F 25/315* (2022.01); *B01F 33/5011* (2022.01); *B01F 33/50111* (2022.01); *B01F 35/7162* (2022.01); *B65D 47/06* (2013.01); *B65D 47/243* (2013.01); *B65D 81/3244* (2013.01); *B01F 23/483* (2022.01); *B65D 47/244* (2013.01)

(56) References Cited

U.S. PATENT DOCUMENTS

| | | | |
|---|---|---|---|
| 1,118,278 A | 11/1914 | Greathead | |
| 1,321,358 A | 11/1919 | Beck | |
| 1,674,233 A | * 6/1928 | Williams | A47G 19/24 |
| | | | 222/511 |
| 1,879,269 A | 9/1932 | Hutchison | |
| 1,961,321 A | 6/1934 | Young | |
| 2,073,273 A | 3/1937 | Erna et al. | |
| 2,102,105 A | 12/1937 | Edward | |
| 2,493,660 A | 1/1950 | Elkins | |
| 3,200,995 A | 8/1965 | Gangwisch | |
| 3,207,486 A | 9/1965 | Daniel | |
| 3,217,931 A | 11/1965 | Farrar et al. | |
| 3,255,691 A | 6/1966 | Marius et al. | |
| 3,325,056 A | 6/1967 | Lewis | |
| 3,347,403 A | 10/1967 | Lehrman | |
| 3,463,361 A | 8/1969 | Cook et al. | |
| 3,506,460 A | 4/1970 | Bayne | |
| 3,508,682 A | 4/1970 | Hollis et al. | |
| 3,641,016 A | 2/1972 | Korosi et al. | |
| 3,760,986 A | 9/1973 | Castner et al. | |
| 3,850,346 A | 11/1974 | Richardson et al. | |
| 3,924,741 A | 12/1975 | Kachur et al. | |
| 4,115,066 A | 9/1978 | Muhle | |
| 4,132,308 A | 1/1979 | Goncalves | |
| 4,221,291 A | 9/1980 | Hunt | |
| 4,315,570 A | 2/1982 | Silver et al. | |
| 4,785,974 A | 11/1988 | Rudick et al. | |
| 4,838,457 A | 6/1989 | Swahl et al. | |
| 4,892,125 A | 1/1990 | Rudick et al. | |
| 4,964,732 A | 10/1990 | Cadeo et al. | |
| 5,045,195 A | 9/1991 | Spangrud et al. | |
| 5,092,750 A | 3/1992 | Leroy et al. | |
| 5,094,861 A | 3/1992 | D'Auguste et al. | |
| 5,165,569 A | 11/1992 | Furuhashi et al. | |
| 5,246,139 A | 9/1993 | Duceppe | |
| 5,325,996 A | 7/1994 | Bannigan | |
| 5,419,445 A | 5/1995 | Kaesemeyer | |
| 5,632,420 A | 5/1997 | Lohrman et al. | |
| 5,641,410 A | 6/1997 | Peltzer | |
| 5,664,702 A | 9/1997 | Beauchamp | |
| 5,707,353 A | 1/1998 | Mazer et al. | |
| 5,839,626 A | 11/1998 | Gross et al. | |
| 5,890,624 A | 4/1999 | Klima et al. | |
| 5,899,363 A | 5/1999 | Bliss, III et al. | |
| 5,919,360 A | * 7/1999 | Contaxis, III | B01F 25/315 |
| | | | 222/105 |
| 5,944,234 A | 8/1999 | Lampe et al. | |
| 5,984,141 A | 11/1999 | Gibler | |
| 5,992,690 A | 11/1999 | Tracy | |
| 5,993,671 A | 11/1999 | Peltzer | |
| 6,003,728 A | 12/1999 | Elliott | |
| 6,010,034 A | 1/2000 | Walthers | |
| 6,136,189 A | 10/2000 | Smith et al. | |
| 6,165,523 A | 12/2000 | Story | |
| 6,180,149 B1 | 1/2001 | Gramm | |
| 6,209,757 B1 | 4/2001 | Dumont | |
| 6,224,778 B1 | 5/2001 | Peltzer | |
| 6,230,923 B1 | 5/2001 | Hung | |
| 6,230,937 B1 | 5/2001 | Johnson et al. | |
| 6,263,924 B1 | 7/2001 | Grosser | |
| 6,395,170 B1 | 5/2002 | Hughes et al. | |
| 6,482,451 B1 | 11/2002 | Baron | |
| 6,517,878 B2 | 2/2003 | Heczko | |
| 6,541,055 B1 | 4/2003 | uzenberg | |
| 6,569,329 B1 | 5/2003 | Nohren | |
| 6,705,490 B1 | 3/2004 | Lizerbram et al. | |
| 6,705,491 B1 | 3/2004 | Lizerbram et al. | |
| 6,820,740 B1 | 11/2004 | Spector | |
| 6,854,595 B2 | 2/2005 | Kiser | |
| 6,923,568 B2 | 8/2005 | Wilmer et al. | |
| 6,959,839 B2 | 11/2005 | Roth et al. | |
| 6,981,962 B1 | 1/2006 | enkersdorf | |
| 7,083,071 B1 | 8/2006 | Crisp, III et al. | |
| 7,118,012 B2 | 10/2006 | Butler | |
| 7,306,117 B2 | 12/2007 | Roth et al. | |
| 7,503,453 B2 | 3/2009 | Cronin et al. | |
| 7,533,786 B2 | 5/2009 | Woolfson et al. | |
| 7,568,576 B2 | 8/2009 | Sweeney, Jr. et al. | |
| 7,658,303 B2 | 2/2010 | Woolfson et al. | |
| 7,661,561 B2 | 2/2010 | Ophardt et al. | |
| 7,670,479 B2 | 3/2010 | Arett et al. | |
| 7,806,294 B2 | 10/2010 | Gatipon et al. | |
| 7,819,276 B2 | 10/2010 | Naisje | |
| 7,909,210 B2 | 3/2011 | Roth et al. | |
| 7,942,569 B2 | 5/2011 | Orben et al. | |
| 7,947,316 B2 | 5/2011 | Kirschner et al. | |
| 8,083,055 B2 | 12/2011 | Simonian et al. | |
| 8,141,700 B2 | 3/2012 | Simonian et al. | |
| 8,167,174 B2 | 5/2012 | Berger | |
| 8,182,683 B1 | 5/2012 | Allen | |
| 8,230,777 B2 | 7/2012 | Anson et al. | |
| 8,302,803 B1 | 11/2012 | Greenberg et al. | |
| 8,306,655 B2 | 11/2012 | Newman | |
| 8,313,644 B2 | 11/2012 | Harris et al. | |
| 8,365,960 B1 | 2/2013 | Kalaouze | |
| 8,413,844 B2 | 4/2013 | Arett et al. | |
| 8,453,833 B2 | 6/2013 | Porter | |
| 8,464,633 B2 | 6/2013 | Anson et al. | |
| 8,511,465 B2 | 8/2013 | Seelhofer | |
| 8,541,039 B2 | 9/2013 | Lackey et al. | |
| 8,580,753 B2 | 11/2013 | Bondarev | |
| 8,590,753 B2 | 11/2013 | Marina et al. | |
| 8,622,237 B2 | 1/2014 | Choi et al. | |
| 8,641,016 B2 | 2/2014 | Tatera | |
| 8,684,231 B2 | 4/2014 | Lane et al. | |
| 8,684,240 B2 | 4/2014 | Sauer et al. | |
| 8,777,182 B2 | 7/2014 | Springer | |
| 8,893,927 B2 | 11/2014 | Olson et al. | |
| 8,931,634 B2 | 1/2015 | Anderson | |

(56) References Cited

U.S. PATENT DOCUMENTS

| | | |
|---|---|---|
| 9,010,379 B2 | 4/2015 | Gothard et al. |
| 9,060,592 B2 | 6/2015 | Brosius |
| 9,090,395 B2 | 7/2015 | Koumans |
| 9,174,777 B2 | 11/2015 | Defemme et al. |
| 9,302,831 B2 | 4/2016 | Nilson et al. |
| 9,498,086 B2 | 11/2016 | Waggoner et al. |
| 9,650,189 B1 | 5/2017 | Lawson et al. |
| 9,694,953 B2 | 7/2017 | Meyers et al. |
| 9,771,195 B2 | 9/2017 | Lawson et al. |
| 9,795,242 B2 | 10/2017 | Waggoner et al. |
| 9,801,492 B1 | 10/2017 | Lin |
| 9,821,288 B2 | 11/2017 | Cerk et al. |
| 10,093,479 B2 | 10/2018 | Fuchs et al. |
| 10,232,998 B2 | 3/2019 | Presche |
| 10,349,766 B2 | 7/2019 | Asseldonk et al. |
| 10,843,142 B2 | 11/2020 | Waggoner et al. |
| 10,888,826 B2 | 1/2021 | Waggoner et al. |
| 11,213,159 B2 | 1/2022 | Waggoner et al. |
| 11,406,946 B2 | 8/2022 | Waggoner et al. |
| 11,583,811 B2 | 2/2023 | Waggoner et al. |
| 12,017,191 B2 | 6/2024 | Waggoner et al. |
| 2001/0025859 A1 | 10/2001 | Dumont |
| 2001/0055242 A1 | 12/2001 | Deshmukh et al. |
| 2003/0168474 A1 | 9/2003 | Nidgery |
| 2004/0007594 A1 | 1/2004 | Esch et al. |
| 2004/0116036 A1 | 6/2004 | Nugent et al. |
| 2004/0188280 A1 | 9/2004 | Young |
| 2004/0262331 A1 | 12/2004 | Noolfson et al. |
| 2005/0115845 A1 | 6/2005 | Cho |
| 2005/0182356 A1 | 8/2005 | Dixon |
| 2005/0234422 A1 | 10/2005 | Oh et al. |
| 2005/0258082 A1 | 11/2005 | Lund et al. |
| 2006/0011664 A1 | 1/2006 | Hammond |
| 2006/0021511 A1 | 2/2006 | Paasch et al. |
| 2006/0021919 A1 | 2/2006 | Olson et al. |
| 2007/0102394 A1 | 5/2007 | Olsen et al. |
| 2007/0138179 A1 | 6/2007 | Jacobs et al. |
| 2007/0253280 A1 | 11/2007 | Orben et al. |
| 2008/0099487 A1 | 5/2008 | Winn |
| 2008/0116221 A1 | 5/2008 | Roth et al. |
| 2008/0149585 A1 | 6/2008 | Valentine |
| 2008/0190958 A1 | 8/2008 | Wyner et al. |
| 2009/0026222 A1 | 1/2009 | Seelhofer |
| 2009/0226585 A1 | 9/2009 | Wroblewski et al. |
| 2009/0236303 A1 | 9/2009 | Lizerbram et al. |
| 2010/0065584 A1 | 3/2010 | Berger |
| 2010/0108715 A1 | 5/2010 | Santagiuliana |
| 2010/0157723 A1 | 6/2010 | Vega |
| 2010/0213223 A1 | 8/2010 | Ballentine |
| 2011/0006071 A1 | 1/2011 | Koumans |
| 2011/0089059 A1 | 4/2011 | Lane et al. |
| 2011/0259769 A1 | 10/2011 | Salinas |
| 2011/0290677 A1 | 12/2011 | Simonian et al. |
| 2011/0290678 A1* | 12/2011 | Simonian ............. B65D 47/243 220/521 |
| 2012/0000880 A1 | 1/2012 | Im |
| 2012/0017766 A1 | 1/2012 | Anson et al. |
| 2012/0031925 A1 | 2/2012 | Greenberg |
| 2012/0223100 A1* | 9/2012 | Simonian ........... B65D 51/2892 222/145.1 |
| 2012/0255973 A1 | 10/2012 | Schlueter et al. |
| 2013/0000733 A1 | 1/2013 | Gothard et al. |
| 2013/0008919 A1 | 1/2013 | Honan et al. |
| 2013/0139893 A1 | 6/2013 | Anson et al. |
| 2013/0240564 A1 | 9/2013 | Albaum |
| 2013/0319915 A1 | 12/2013 | Gellibolian et al. |
| 2013/0334250 A1 | 12/2013 | Albaum |
| 2014/0076173 A1 | 3/2014 | Dellaud et al. |
| 2014/0092703 A1 | 4/2014 | Helou et al. |
| 2014/0230659 A1 | 8/2014 | Waggoner et al. |
| 2015/0065587 A1 | 3/2015 | Ochoa et al. |
| 2015/0128811 A1 | 5/2015 | Durairajasivam et al. |
| 2015/0158654 A1 | 6/2015 | Petrov |
| 2015/0307265 A1 | 10/2015 | Winn et al. |
| 2015/0336722 A1* | 11/2015 | Brook-Chrispin ............ B65D 51/2807 222/1 |
| 2015/0336724 A1 | 11/2015 | Simonian et al. |
| 2016/0001936 A1 | 1/2016 | Rap et al. |
| 2016/0143583 A1 | 5/2016 | Jeukendrup et al. |
| 2016/0150914 A1 | 6/2016 | Waggoner et al. |
| 2016/0152408 A1* | 6/2016 | Fuchs .................. B65D 85/808 426/115 |
| 2016/0159632 A1 | 6/2016 | Wheatley et al. |
| 2016/0317985 A1 | 11/2016 | Mutschler et al. |
| 2017/0043999 A1 | 2/2017 | Murison et al. |
| 2017/0156540 A1 | 6/2017 | Waggoner et al. |
| 2017/0232406 A1 | 8/2017 | Waggoner et al. |
| 2017/0296988 A1 | 10/2017 | Waggoner et al. |
| 2018/0178957 A1 | 6/2018 | Zalewski |
| 2018/0296023 A1 | 10/2018 | Waggoner et al. |
| 2019/0060849 A1 | 2/2019 | Waggoner et al. |
| 2019/0291065 A1 | 9/2019 | Waggoner et al. |
| 2020/0139313 A1 | 5/2020 | Waggoner et al. |
| 2020/0156020 A1 | 5/2020 | Waggoner et al. |
| 2021/0060503 A1 | 3/2021 | Waggoner et al. |
| 2021/0169264 A1 | 6/2021 | Waggoner et al. |
| 2021/0252464 A1 | 8/2021 | Waggoner et al. |
| 2022/0175174 A1 | 6/2022 | Waggoner et al. |
| 2022/0248892 A1 | 8/2022 | Waggoner et al. |
| 2022/0248893 A1 | 8/2022 | Waggoner et al. |
| 2022/0248894 A1 | 8/2022 | Waggoner et al. |
| 2023/0084794 A1 | 3/2023 | Waggoner et al. |
| 2023/0226503 A1 | 7/2023 | Waggoner et al. |

FOREIGN PATENT DOCUMENTS

| | | |
|---|---|---|
| AU | 2015349694 B2 | 5/2020 |
| CA | 2777990 A1 | 11/2013 |
| CA | 2953158 A1 | 12/2014 |
| CA | 2968546 A1 | 5/2016 |
| CA | 3053808 A1 | 8/2018 |
| CN | 1271257 A | 10/2000 |
| CN | 1607167 A | 4/2005 |
| CN | 1953938 A | 4/2007 |
| CN | 101300190 A | 11/2008 |
| CN | 101432221 A | 5/2009 |
| CN | 102123938 A | 7/2011 |
| CN | 101068745 B | 6/2012 |
| CN | 102740812 A | 10/2012 |
| CN | 106132289 A | 11/2016 |
| CN | 207561774 U | 7/2018 |
| CN | 110612050 A | 12/2019 |
| CN | 107205565 B | 7/2020 |
| CN | 114794870 A | 7/2022 |
| EP | 0 564 208 A1 | 10/1993 |
| EP | 0 795 267 A2 | 9/1997 |
| EP | 1 407 827 A2 | 4/2004 |
| EP | 1 876 901 B1 | 11/2011 |
| EP | 3 220 783 B1 | 8/2019 |
| EP | 3 585 224 A1 | 1/2020 |
| JP | S60-92965 U | 6/1985 |
| JP | H01-126934 U | 8/1989 |
| JP | H06-8999 A | 1/1994 |
| JP | 2001-500205 A | 1/2001 |
| JP | 2003-200088 A | 7/2003 |
| JP | 2005-289518 A | 10/2005 |
| JP | 2006-264761 A | 10/2006 |
| JP | 2009-107672 A | 5/2009 |
| JP | 2009-523576 A | 6/2009 |
| JP | 2010-195481 A | 9/2010 |
| JP | 2012-006663 A | 1/2012 |
| JP | 2012-188142 A | 10/2012 |
| JP | 2013-517188 A | 5/2013 |
| JP | 2013-545673 A | 12/2013 |
| JP | 2014-208281 A | 11/2014 |
| JP | 2018-503571 A | 2/2018 |
| SG | 11201407344 | 12/2014 |
| WO | WO 98/005853 A1 | 2/1998 |
| WO | WO 99/08578 A1 | 2/1999 |
| WO | WO 99/47450 A1 | 9/1999 |
| WO | WO 2001/000521 A1 | 1/2001 |
| WO | WO 2011/149501 A1 | 12/2011 |

(56) References Cited

FOREIGN PATENT DOCUMENTS

| WO | WO 2013/169466 A1 | 11/2013 |
|----|-------------------|---------|
| WO | WO 2016/081925 A1 | 5/2016  |
| WO | WO 2017/152192 A1 | 9/2017  |
| WO | WO 2018/156816 A1 | 8/2018  |
| WO | WO 2020/046976 A3 | 7/2020  |
| WO | WO 2021/108781 A1 | 6/2021  |

OTHER PUBLICATIONS

Partial Supplemental European Search Report dated Apr. 19, 2022 in connection with European Application No. 19854883.6.
International Preliminary Report on Patentability mailed Mar. 11, 2021 in connection with International Application No. PCT/US2019/048389.
International Search Report and Written Opinion mailed Jan. 17, 2020 in connection with International Application No. PCT/US2019/048389.
International Search Report and Written Opinion mailed Dec. 23, 2021 connection with International Application No. PCT/US2021/041887.
Invitation to Pay Additional Fees mailed Oct. 6, 2021 in connection with International Application No. PCT/US2021/041887.
Chinese Office Action and English Translation thereof dated Oct. 27, 2021 in connection with Chinese Application No. 201880012762.X.
Extended European Search Report and Opinion dated Nov. 16, 2020 in connection with European Application No. 18757631.9.
International Preliminary Report on Patentability mailed Sep. 6, 2019 in connection with International Application No. PCT/US2018/019295.
International Search Report and Written Opinion mailed May 16, 2018 in connection with International Application No. PCT/US2018/019295.
Australia Office Action dated May 10, 2019 in connection with Australia Application No. Application 2015349694.
Australian Office Action dated May 17, 2022 in connection with Australian Application No. 2020217420.
Australian Office Action dated May 31, 2021 in connection with Australian Application No. 2020217420.
Chinese Office Action and English Translation thereof dated Jan. 8, 2019 in connection with Chinese Application No. 201580062670.9.
Extended European Search Report and Opinion dated Jun. 13, 2018 in connection with European Application No. 15861063.4.
Japanese Office Action and English translation thereof dated Jul. 30, 2019 in connection with Japanese Application No. 2017-545871.
Japanese Office Action and English translation thereof dated Aug. 6, 2021 in connection with Japanese Application No. 2020-113813.
International Preliminary Report on Patentability mailed Jun. 1, 2017 in connection with International Application No. PCT/US2015/062026.
International Search Report and Written Opinion mailed Feb. 5, 2016 in connection with International App. No. PCT/US2015/062026.
Australian Office Action dated Jan. 25, 2022 in connection with Australian Application No. 2017228456.
Chinese Office Action and English Translation thereof dated May 13, 2020 in connection with Chinese Application No. 201780013261.9.
Extended European Search Report dated Jul. 9, 2019 in connection with European Application 17760997.1.
Supplemental European Search Report dated Jul. 26, 2019 in connection with European Application 17760997.1.
Japanese Office Action and English translation thereof dated Mar. 30, 2021 in connection with Japanese Application No. 2018-545355.
International Preliminary Report on Patentability mailed Sep. 4, 2018 in connection with International Application No. PCT/US2017/021016.
International Search Report and Written Opinion mailed Jun. 6, 2017 in connection with International Application No. PCT/US2017/021016.
[No Author Listed], How To Clean A Draft Beer Tap Keg Coupler. Youtube.com, Leaders Beverage, Aug. 6, 2014;1 page. (https://www.youtube.com/watch?v=LmtdkjdEq1E) 0:00-6:03.
[No Author Listed], Inspection Keg 1/2 BBL. GW Kent, Mar. 24, 2017; 3 pages. (https://web.archive.org/web/20170424051250/http://www.gwkent.com/inspection-keg.html).

* cited by examiner

ADJUSTABLE ADDITIVE DELIVERY SYSTEMS AND METHODS

PRIORITY CLAIM AND REFERENCE TO RELATED APPLICATIONS

This application is a continuation of U.S. application Ser. No. 17/146,463, filed Jan. 11, 2021, which is a continuation of U.S. application Ser. No. 15/451,384, titled ADJUSTABLE ADDITIVE CARTRIDGE SYSTEMS AND METHODS, filed on Mar. 6, 2017, and this application is a continuation of U.S. application Ser. No. 16/679,060, filed Nov. 8, 2019, titled ADJUSTABLE ADDITIVE CARTRIDGE SYSTEMS AND METHODS, which is a divisional of U.S. application Ser. No. 15/451,384, titled ADJUSTABLE ADDITIVE CARTRIDGE SYSTEMS AND METHODS, filed on Mar. 6, 2017, which claims priority under all applicable laws, treaties, conventions and regulations, to U.S. Provisional Application No. 62/303,376, titled CARTRIDGE RESERVOIR SYSTEMS, filed on Mar. 4, 2016 and U.S. Provisional Application No. 62/363,177, titled ADJUSTABLE ADDITIVE CARTRIDGE SYSTEMS, filed on Jul. 15, 2016; and which is a continuation-in part of U.S. application Ser. No. 15/358,087, titled ADJUSTABLE ADDITIVE CARTRIDGE SYSTEMS, filed Nov. 21, 2016, which is a continuation of U.S. application Ser. No. 14/948,225, filed on Nov. 20, 2015, now U.S. Pat. No. 9,498,086, which claims priority to U.S. Provisional Application No. 62/083,129, filed on Nov. 21, 2014. The subject matter described in all applications is incorporated herein by reference in its entirety. Where an element or subject matter of this application or a part of the description, claims or drawings in the aforementioned applications are not otherwise contained in this application, that element, subject matter or part is incorporated by reference in this application for the purposes of any and all applicable rules, procedures or laws.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Technical Field

The disclosure relates to dispensing and delivery systems for beverages and other products. The disclosure further relates to dispensing and delivery systems in which an additive, such as flavorings, concentrates or supplements, may be provided in replaceable cartridges and mixed with a base fluid, such as water, as the base fluid is dispensed and/or consumed from a container and wherein one-way flow of base fluid is provided to prevent additive from mixing with the base fluid supply, which may thus be used with different additive delivery systems. The disclosure further relates to dispensing and delivery systems and additive delivery systems that provide for user adjustment of the amount of additive that is mixed with the base fluid. The disclosure further relates to reservoir assemblies for storage of additives and for use in such additive delivery systems, and to methods for making and using such systems.

2. Prior Art

The prior art includes various devices for providing additives to a base liquid. Such devices include pre-mix systems, such as those described in U.S. Pat. No. 7,306,117, in which a predetermined amount of additive is dispensed into a base liquid within the container and mixed therewith prior to consumption. Prior art systems also include devices in which an additive is provided to a base fluid as it is dispensed from a container. Such delivery systems are exemplified by U.S. Pat. No. 8,230,777, which describes a dispensing system in which a base liquid flows through a supplement area containing solid supplements, and U.S. Pat. No. 8,413,844, which describes a water dispenser (pitcher) having a filter and an additive chamber in which the additive is dispensed as water is poured from the dispenser. There is a need in the art for systems and methods that improve upon these prior art undertakings.

SUMMARY OF THE INVENTION

According to one aspect of the disclosure, an additive delivery system may incorporate a cartridge system, including a container cap and an additive reservoir assembly that provides for storage of an additive. The container cap may be secured to a base fluid container. A mixing nozzle is cooperatively associated with the container cap for mixing of the additive with a base fluid as the base fluid flows from the base fluid container through the cartridge. A one-way valve prevents backflow of base fluid and/or mixed base fluid/additive from an area downstream of the mixing nozzle such that the base fluid supply remains in a pure state. These features permit different cartridge assemblies, containing different respective additives, to be used with a given supply of base fluid. Moreover, this feature permits a given additive to be used with a given supply of base fluid without requiring the entire supply of base fluid to be used or consumed in a mixed state. A leftover supply of base fluid may remain unmixed and used in other applications, such as with other flavorings or supplements. The additive delivery systems enable more efficient use of both additive and base fluid.

According to another aspect of the invention, an additive delivery system may incorporate a cartridge system and provide for adjustable flow of additive and adjustable mixing of additive with a base fluid as the base fluid flows through the additive delivery system. An adjustment actuator may be moved by a user to cause a corresponding adjustment in valve components incorporated into the additive delivery system. The valve components may include a metering component, which may have a conical portion that cooperates with a mixing nozzle having a correspondingly shaped seat to provide precise control of additive flow. Movement of the adjustment actuator by a user results in movement of the metering component in precise fashion to increase or decrease the flow of additive that occurs when base fluid is dispensed through the cartridge. Indicia may be included to indicate relative degrees of additive flow and mixing to the user. This feature permits a user to achieve a desired and repeatable mixing proportion of additive to base fluid.

According to another aspect, an additive delivery system may utilize a cartridge system that provides improved flow geometries that enhance mixing of additive and base fluid as the additive and base fluid flow from the cartridge. Such flow geometries may include a central flow component for the additive and a surrounding or radially displaced flow component for the base fluid. They may also include one or more convergence zone in the additive flow path. Such flow geometries may also be used in conjunction with one or more agitating or turbulence creating elements incorporated into a dispensing spout downstream of a mixing area in the cartridge assembly to further enhance the mixing of the additive and base fluid prior to use or consumption. Such flow geometries and agitating or turbulence creating elements provide for thorough mixing of additive and base fluid.

According to one aspect of the disclosure, a reservoir assembly for use with an additive delivery system and cartridge may include a flexible reservoir such as a pouch, bag, bladder or other flexible reservoir structure. This reservoir assembly structure provides improved flow and mixing characteristics by reducing or eliminating vacuum in the reservoir as additive is dispensed. A protective cage or solid walled protective housing may enclose the reservoir to protect it during sale/shipping. In the case of a protective cage or other external element with apertures or holes, such flexible reservoir structures may also permit external pressure to be applied to the additive reservoir, such as pressure created when a user squeezes or otherwise applies pressure to a container, i.e., water bottle, in which the cartridge is housed. This interaction between the flexible cartridge reservoir structure and the interior conditions may facilitate more uniform or consistent dispensing of additive from the cartridge and more uniform mixing with a base fluid.

According to another aspect, a cartridge assembly is packaged and distributed as a unit that includes a reservoir assembly and adjustable mixing cap, such that the cartridge assembly may be installed on a user's own bottle of base fluid, such as a water bottle purchased separately. A frangible protective outer safety membrane, such as a shrink wrap, or foil pouch, may seal the entire cartridge assembly package for quality and safety control.

Unless otherwise defined, all technical and scientific terms used herein have the same meaning as commonly understood by one of ordinary skill in the art to which the described invention pertains. Although other implementations, methods and materials similar to those described herein can be used to practice the invention, suitable and example implementations, methods and materials are described below. All publications, patent applications, and other references mentioned herein are incorporated by reference in their entirety. In case of conflict, the present specification, including definitions, will control. In addition, the materials, methods and examples are illustrative only and are not intended to be limiting in any way. The details of one or more example implementations of the invention are set forth in the accompanying drawings and the description below. Other features, objects and advantages of the invention will be apparent from the description and drawings, and from the claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

DETAILED DESCRIPTION

Figure 1:
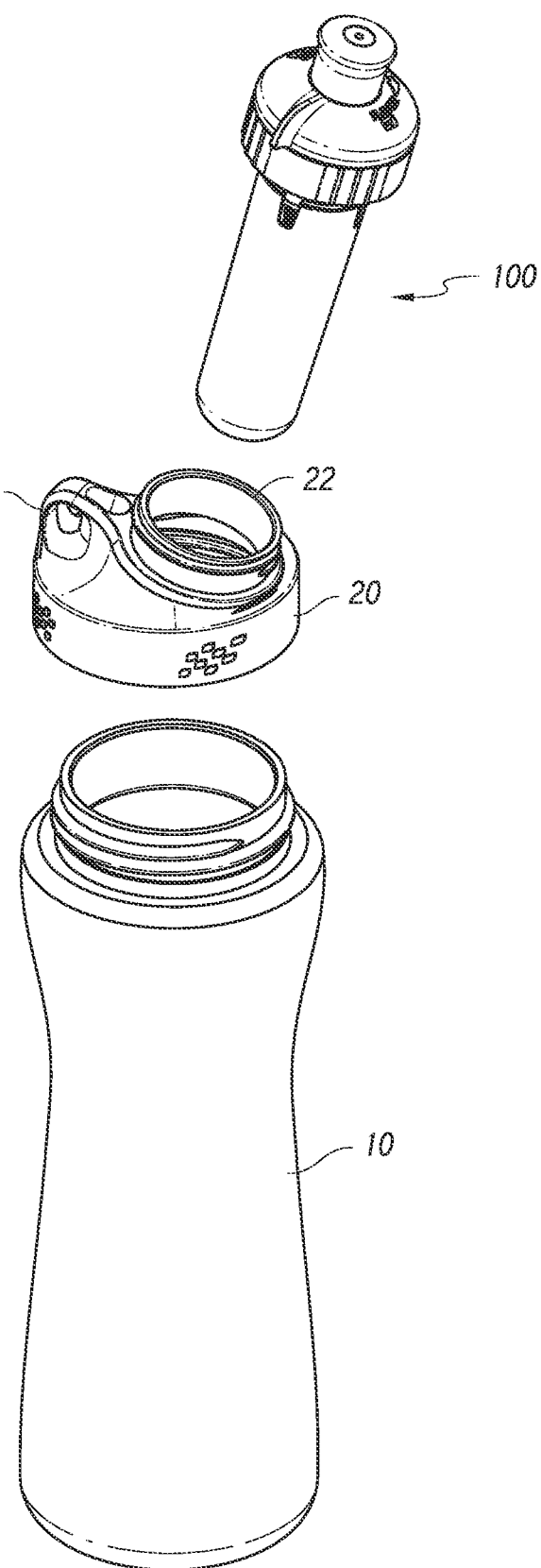
FIG. 1 is an exploded perspective view of an example dispensing and delivery system including an additive delivery system, both according to an aspect of the disclosure.

FIG. 1 is an exploded perspective view of an example beverage dispensing system utilizing an example additive delivery system according to an aspect of the disclosure. A bottle 10 may include a bottle lid 20 for sealing an interior space of the bottle 10. Threads, which are integrally molded on the bottle 10 cooperate with internal threads molded on bottle lid 20 to provide sealed fastening between the two components. A handle 24 may be molded into the lid 20 and an umbrella check valve or vent (not shown in FIG. 1) may be provided in the lid 20 in a known manner to reduce or eliminate vacuum in the bottle interior and prevent base fluid from leaking out of the vent when a base fluid is dispensed therefrom. Lid 20 includes a cartridge receiving mouth 22 having a threaded fastener formed on an exterior surface thereof for receiving an additive delivery system, such as the example additive delivery system, also referred to herein as a cartridge, generally referenced 100 in FIG. 1.

Figure 2:
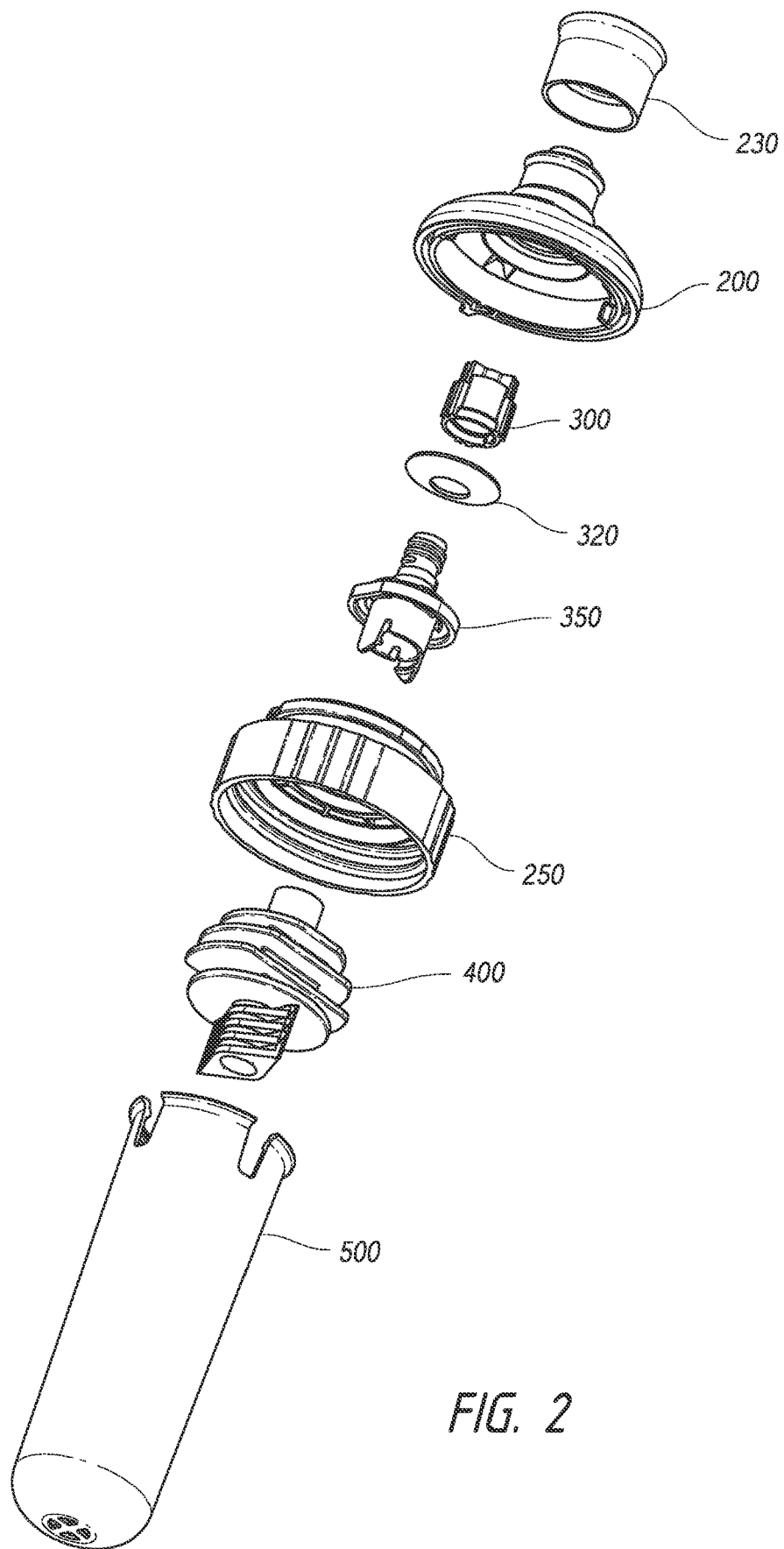
FIG. 2 is an exploded upper perspective view of an example cartridge assembly for an additive delivery system according to an aspect of the disclosure.
Figure 3:
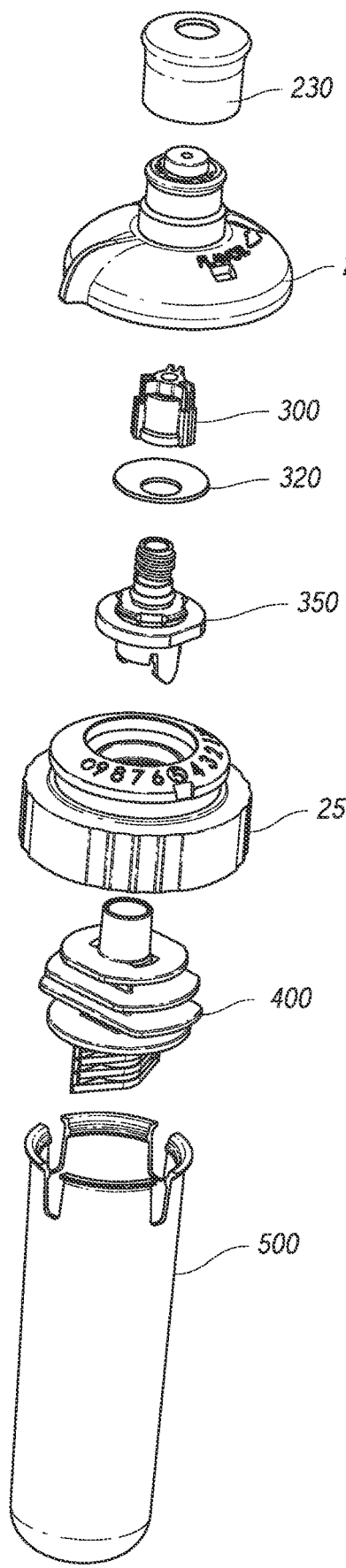
FIG. 3 is an exploded lower perspective view of the example cartridge assembly of FIG. 2.
Figure 4:
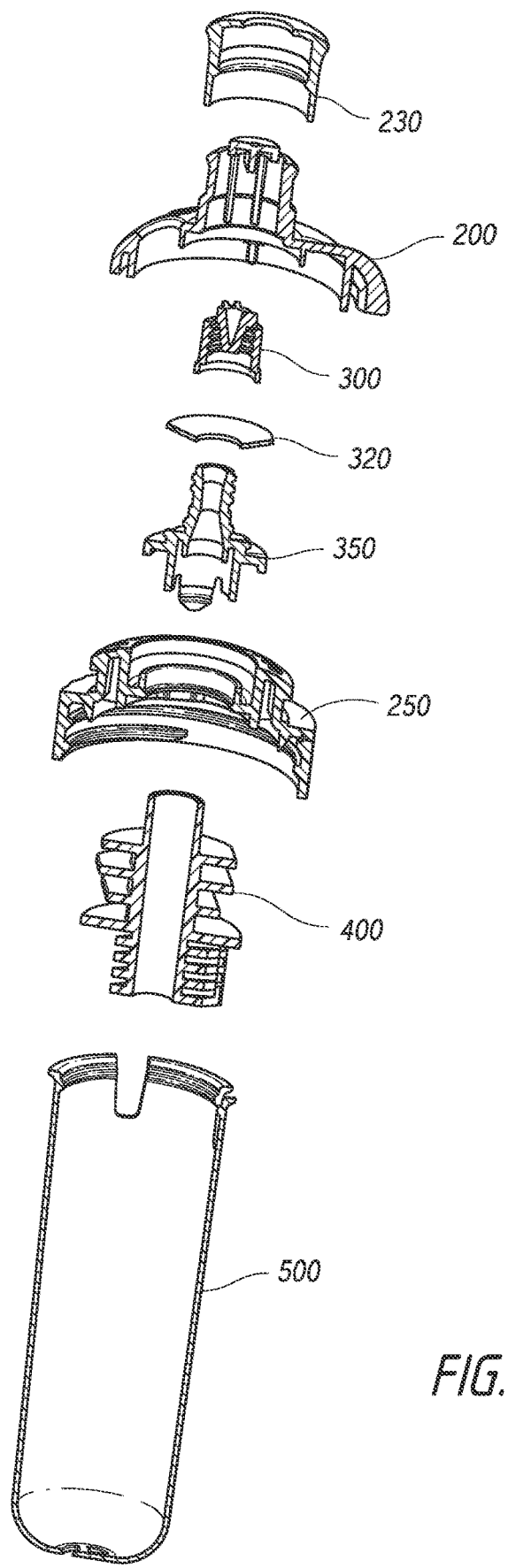
FIG. 4 is an exploded cutaway view of the example cartridge assembly of FIG. 2.
Figure 5:
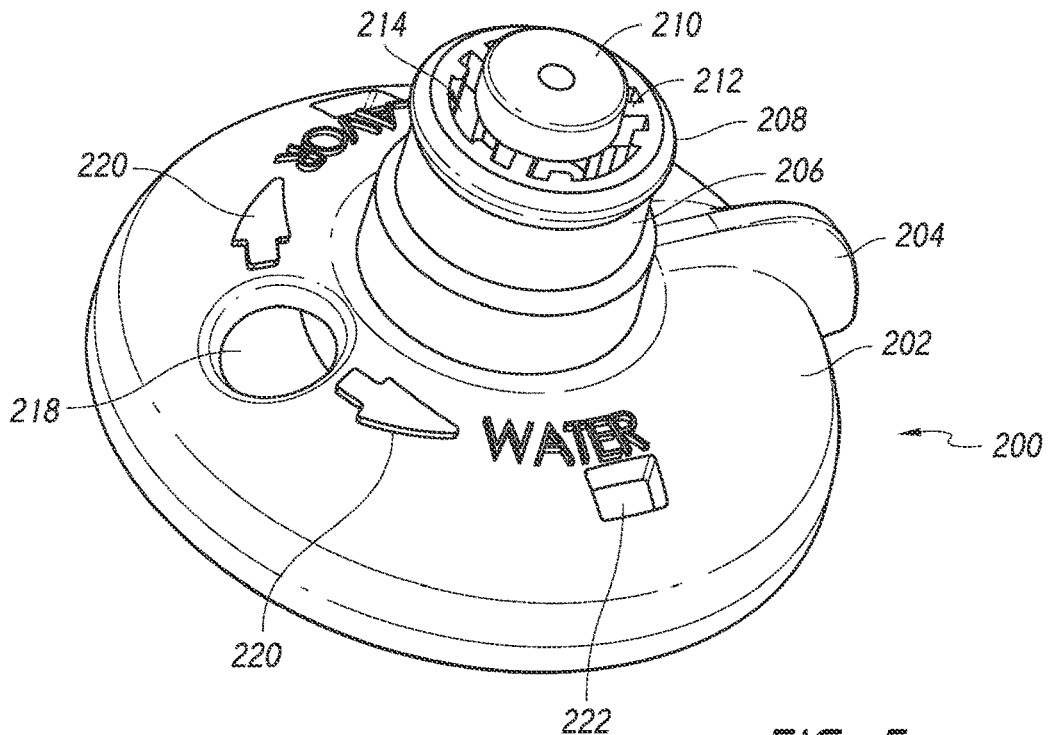
FIG. 5 is perspective view of an example additive adjustment actuator according to an aspect of the disclosure.
Figure 6:
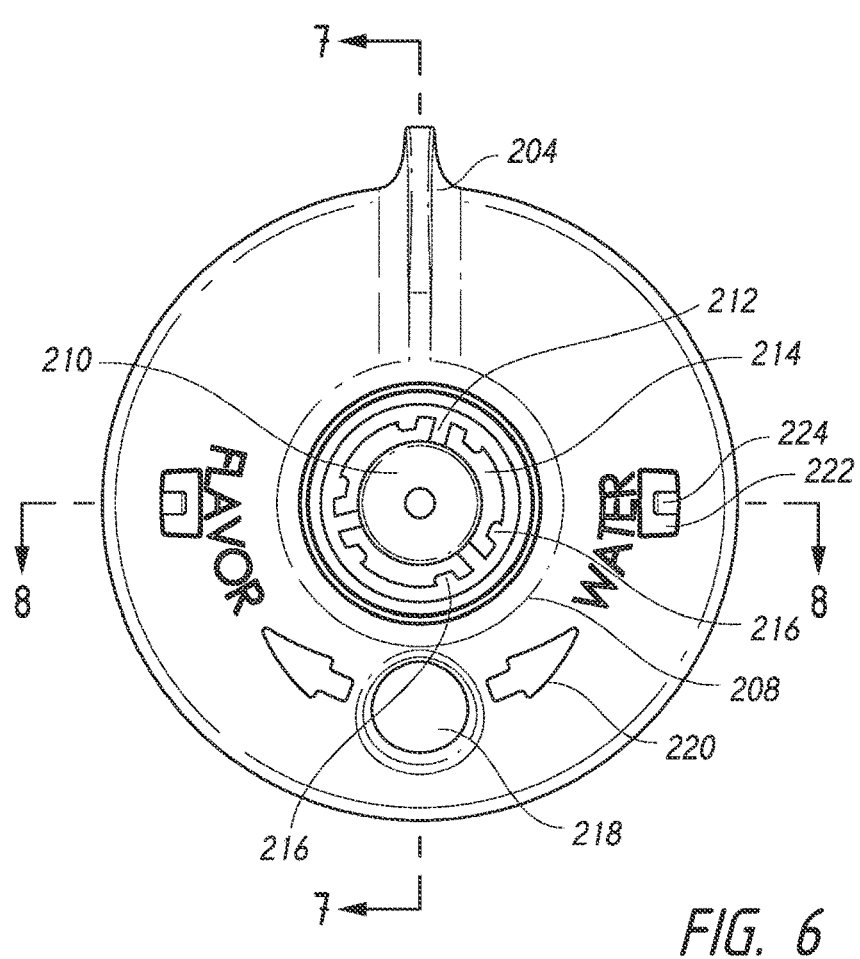
FIG. 6 is a top view of the example additive flow adjustment actuator of FIG. 5.
Figure 7:
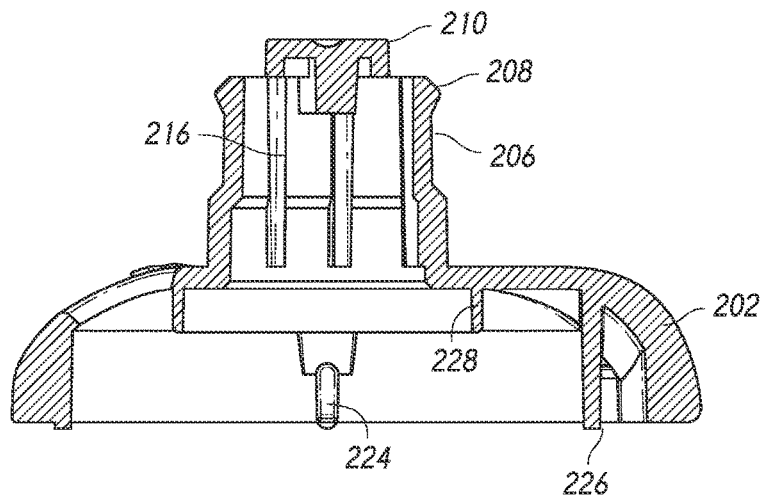
FIG. 7 is a sectional view taken in plane A-A in FIG. 6.
Figure 8:
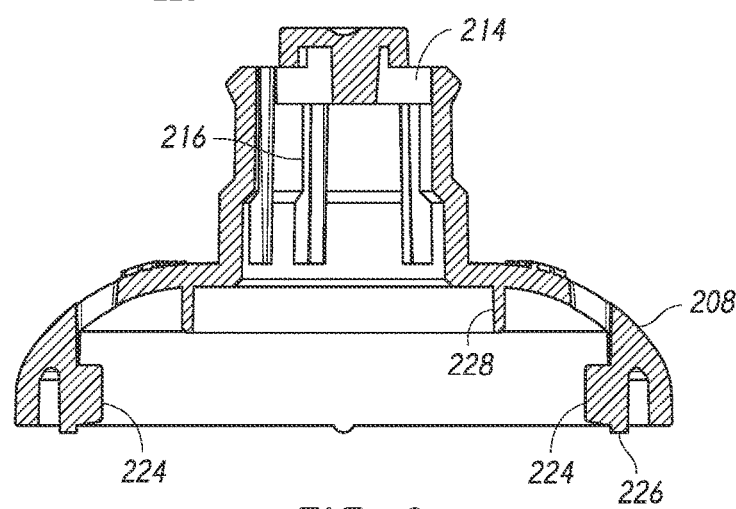
FIG. 8 is a sectional view taken in plane B-B in FIG. 6.
Figure 9:
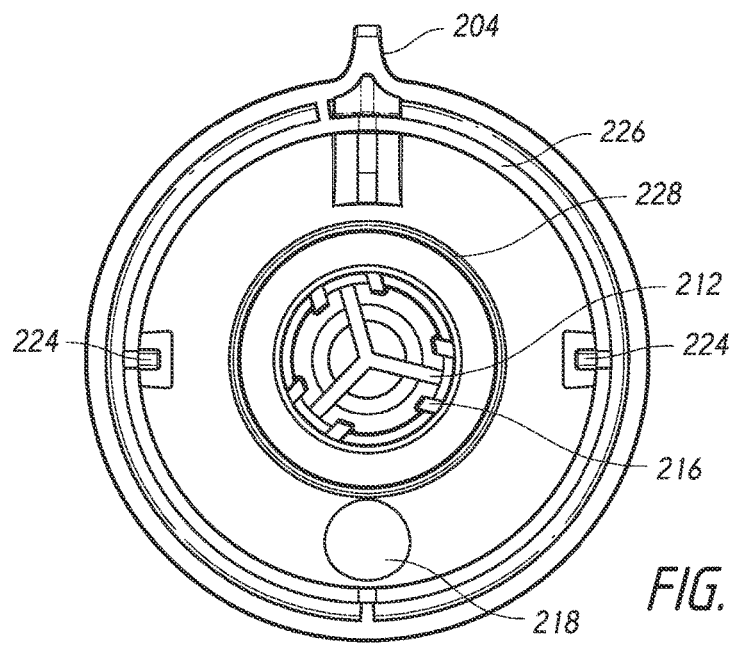
FIG. 9 a bottom view of the example additive flow adjustment actuator of FIG. 5.
Figure 10:
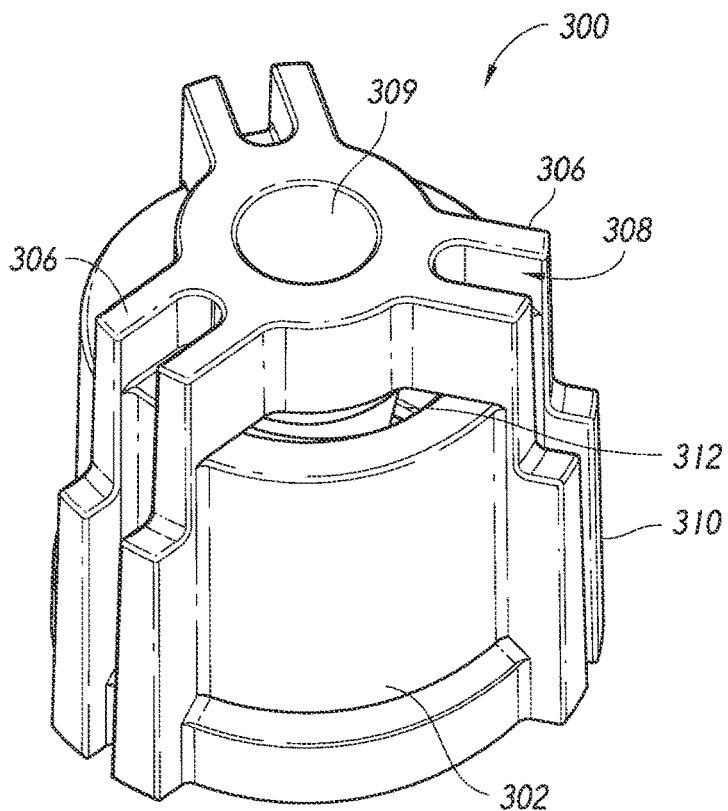
FIG. 10 is a perspective view of an example additive flow metering insert according to an aspect of the disclosure.
Figure 11:
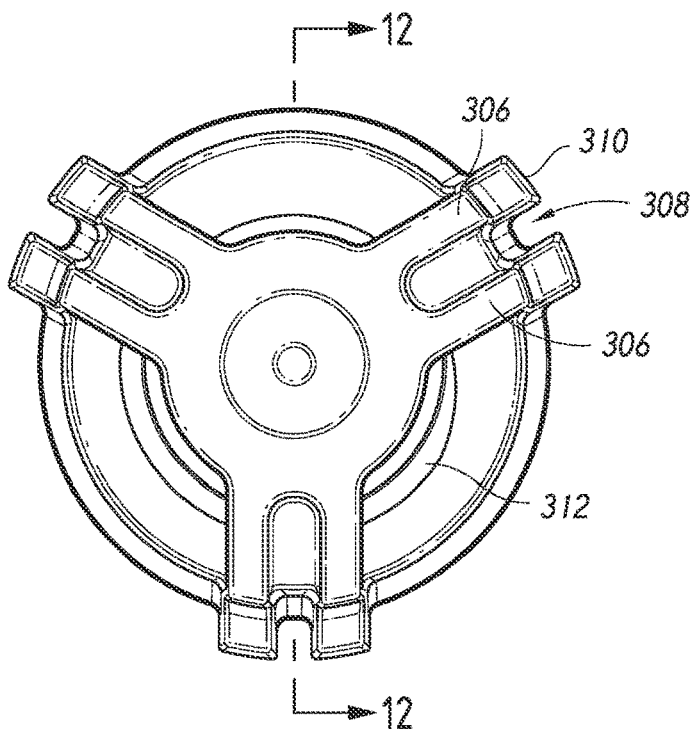
FIG. 11 is a top view of the example additive flow metering insert of FIG. 10.

Referring additionally to FIGS. 2-4, which are exploded views of an example cartridge assembly providing an additive delivery system according to an aspect of the disclosure, the system may include a number of components that are assembled in a generally stacked arrangement using snap-fit or threaded connections that facilitate quick assembly, as will be described in more detail below. The components may include a cartridge cap comprising an additive flow adjustment actuator 200 cooperating with and mounted for limited rotational movement relative to a cartridge cap base 250. Additive flow adjustment actuator may include a dispensing spout and a push-pull closure 230 mounted thereon for selectively permitting and preventing egress of mixed fluid from the cartridge. Disposed between the additive flow adjustment actuator 200 and cartridge cap base 250 are an additive flow metering component 300, which cooperates with a mixing nozzle 350. An annular one-way base fluid flow sealing element 320 provides for one-way flow of base fluid through the cartridge, preventing backflow, as will be described. A reservoir assembly including a pouch reservoir spout 400, reservoir (see FIGS. 21 and 23) and protective outer housing 500, may be secured to the mixing nozzle 350, and thus the cap base 250 as will be explained. The pouch may be a flexible pouch containing an additive supply and fastened in sealing engagement to pouch reservoir spout 400. The reservoir assembly may be secured using snap fittings or other fastening elements, such as threaded fasteners or friction fastening, within the cartridge cap base 250 and also fit to mixing nozzle 350 in a manner that will be explained. The reservoir protective housing 500, which may be a cage or a solid-walled (illustrated) cover, may be snap-fit to a flange of the pouch reservoir spout 400 to protect the interior flexible reservoir pouch containing additive. The reservoir housing 500 and reservoir pouch may be made of a transparent or translucent material to permit a user to view and identify the nature of the additive supply. Details regarding each of the above-described example components as well as their cooperating relationships will now be described.

Referring now to FIGS. 5-9, these figures illustrate an example additive flow adjustment actuator 200. This component may include a main body portion 202 with an actuation tab 204 to enable a user to rotate the actuator 200. A spout portion 206 extends upward from the main body portion 202 and provides for flow of mixed fluid from the cartridge. The spout portion 206 and may include an integral retaining ring 208 formed in a top portion thereof for retaining a push-pull cap (FIGS. 2-4) thereon. A circular projection 210 is disposed on the top of the spout 206 and supported by three spoke elements 212. Projection 210 functions to provide a seal with the push-pull cap 230 (FIGS. 2-4) and to provide agitation or turbulence as mixed fluid exits the cartridge. A number of axially extending guide rails 216 are defined on an interior of the spout portion 206 and define guide channels therebetween, which cooperate with and guide complementarily-shaped elements on additive flow metering component 300 (FIGS. 2-4), as will be explained. A window or aperture 218 is defined in the main body portion to enable a user to view an adjustment setting indicating the relative position of the actuator 200 and associated level of additive flow. Indicia 220 may be provided as molded elements on the actuator 200 to indicate directions for increasing additive (FLAVOR) or base fluid (WATER). A pair of recesses 222 may be provided in the main body portion 202 for facilitating molding of the actuator 200. Retaining tabs 224 and an outer annular wall 226 and inner annular wall 228 provide for mating and rotational engagement and support of the actuator 202 with the cartridge cap base 250, as will be explained.

Figure 12:
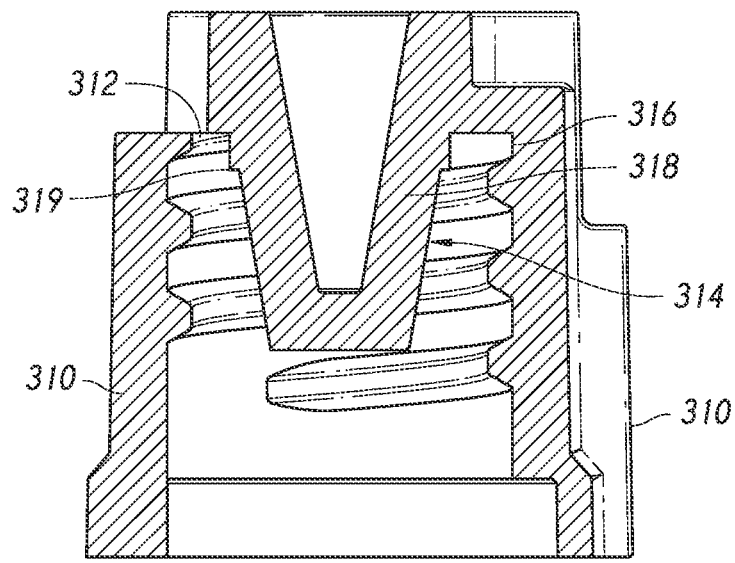
FIG. 12 is a sectional view taken in plane A-A in FIG. 11.
Figure 13:
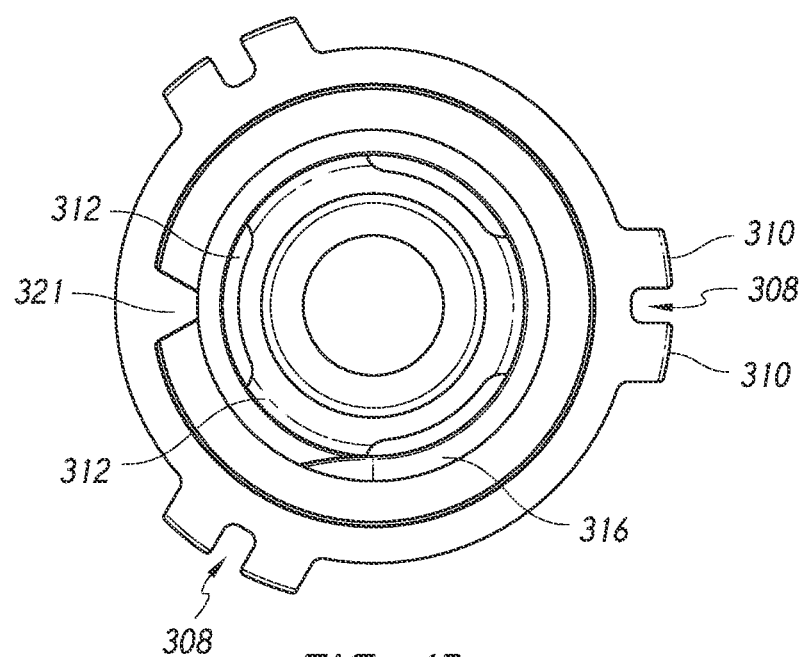
FIG. 13 is a bottom view of the example additive flow metering insert of FIG. 10.

Referring additionally to FIGS. 10-13, these figures illustrate details of an example additive flow metering component 300 according to an aspect of the disclosure. The metering component may be provided as a generally cylindrical element having a cylindrical body portion 302 and a conical metering projection or element 318 (FIG. 12). An annular additive flow passage 312 is defined on the additive flow metering component 300. A number of projections 306 and 310 are defined on an outer surface of the main body portion 302 and define guide channels 308. These elements cooperate with the rails and channels defined in the actuator 200, as described above with reference to FIGS. 5-9) to permit the component 300 to move axially (upward/downward) in a guided cooperative relationship with the actuator 200 but to also cause the component 300 to rotate with the actuator 200. The generally annular additive flow passage 312 is defined between the main body portion 302 and conical metering element 318 to permit flow of additive through the component. Metering element 318 defines a metering surface 314 (FIG. 12), which cooperates with a surface on mixing nozzle 350 (FIGS. 2-4) to provide precise flow control of additive flowing through the cartridge. Metering component 300 includes internal threads 316 which cooperate with threads on mixing nozzle 350 to provide axial movement of the metering surface 314 relative to the counterpart surface on mixing nozzle 350 when the component 300 is rotated relative to the mixing nozzle 350. A shoulder 319 (FIG. 12) is defined in an upper area of conical element 318 to provide a food safety seal when the conical element is in a closed and sealed position within the mixing nozzle 350. The shoulder may deform to facilitate a tight seal. A positive locking projection 321 (FIG. 13) extends radially inward on a lower portion of the component 300. This projection cooperates with a detent channel (368 in FIG. 14) to provide for positive locking of the component 300 within the mixing nozzle 350 during an assembly and packaging operation and to positively indicate that the component 300 has been installed in (rotated to) a consistent and predetermined position on the mixing nozzle, with the component 300, by virtue of shoulder 319 and the conical surface 314 then providing a standard food-safety grade seal with the mixing nozzle 350.

Figure 14:
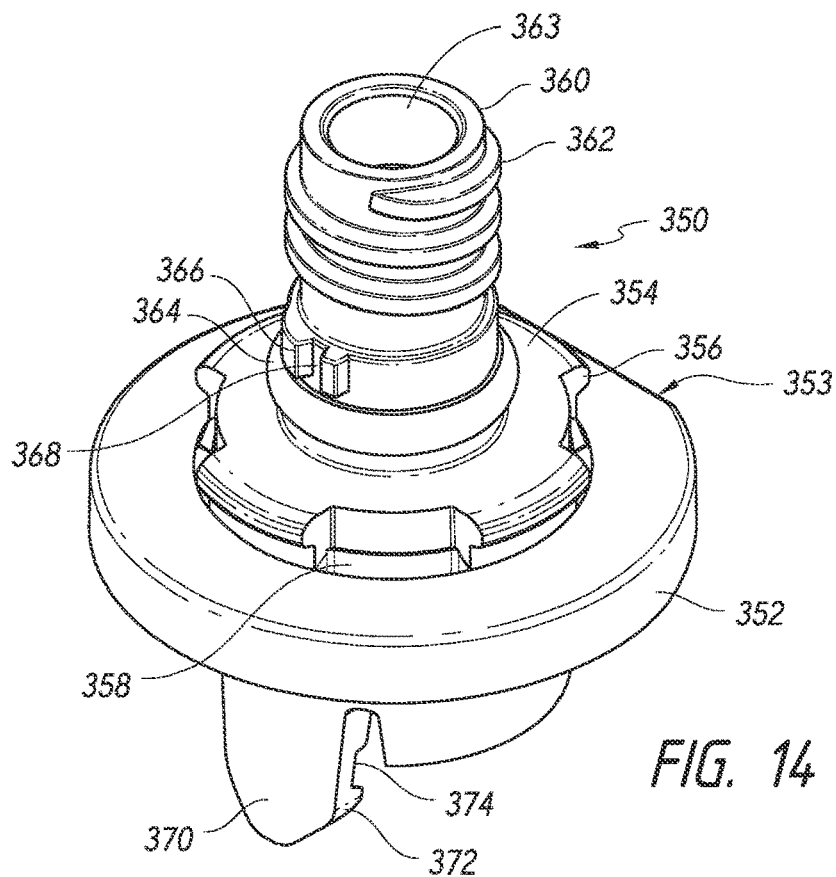
FIG. 14 is a perspective view of an example mixing nozzle according to an aspect of the disclosure.
Figure 15:
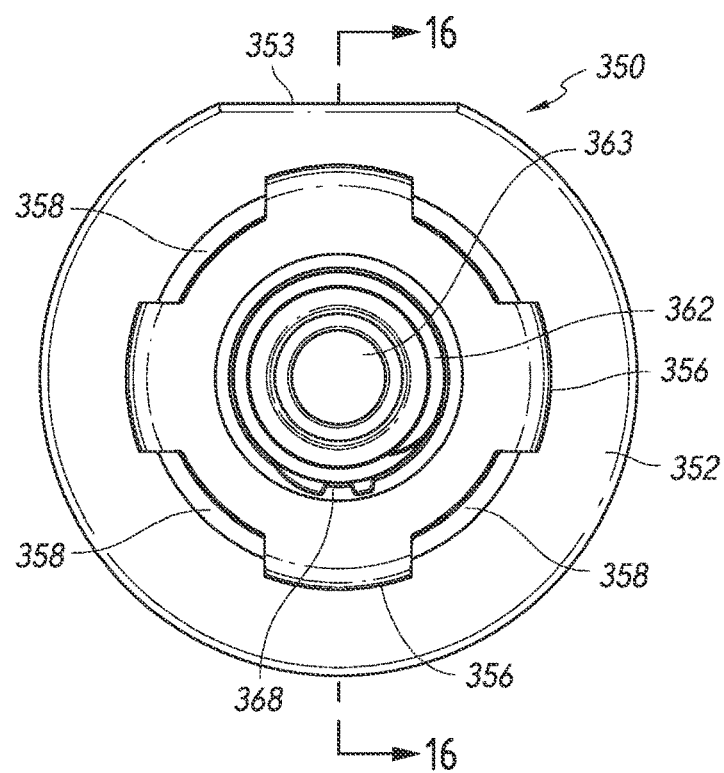
FIG. 15 is a top view of the mixing nozzle of FIG. 14.
Figure 16:
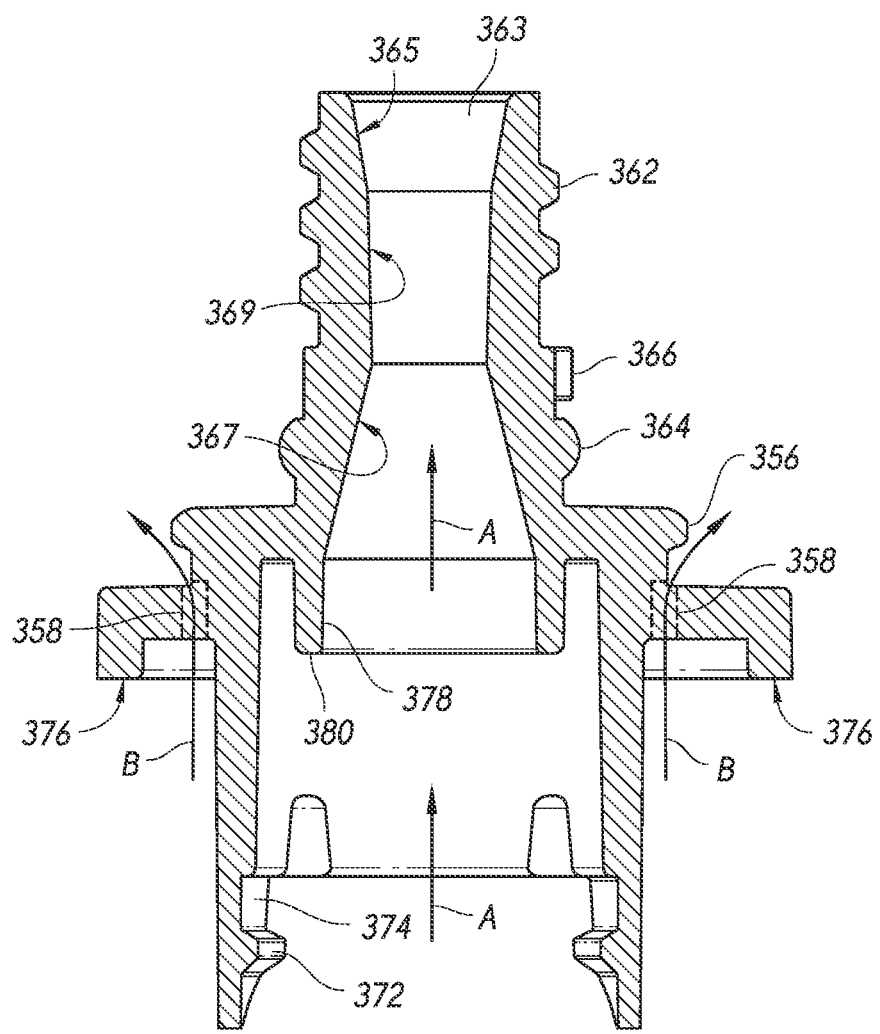
FIG. 16 is a sectional view taken in plane A-A of FIG. 15.
Figure 17:
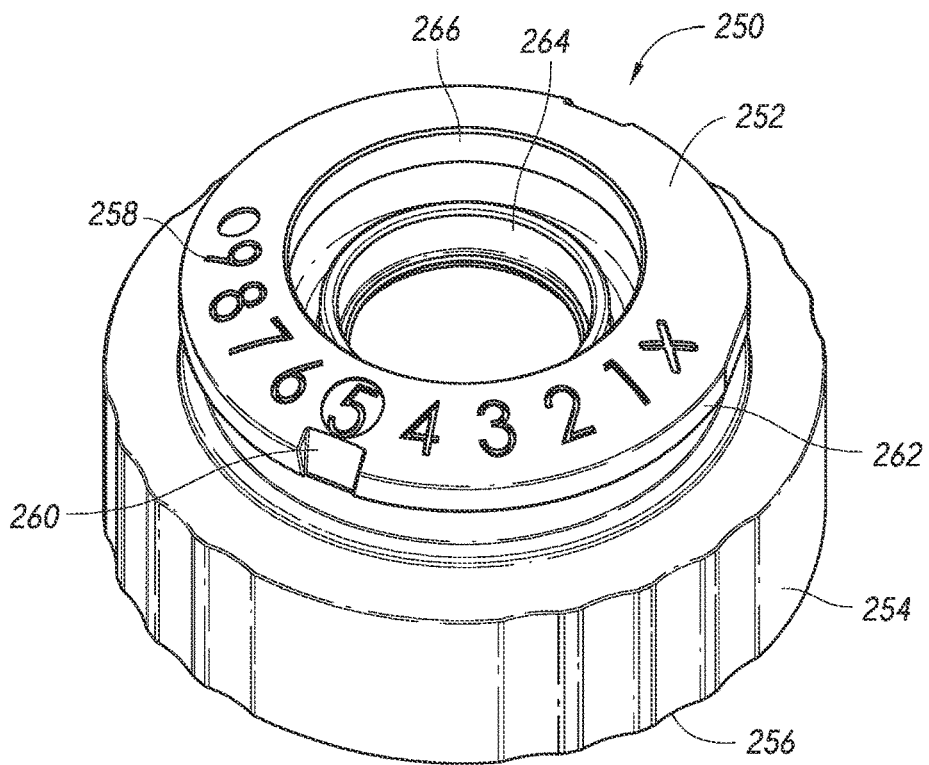
FIG. 17 is a perspective view of an example cartridge cap base according to an aspect of the disclosure.
Figure 18:
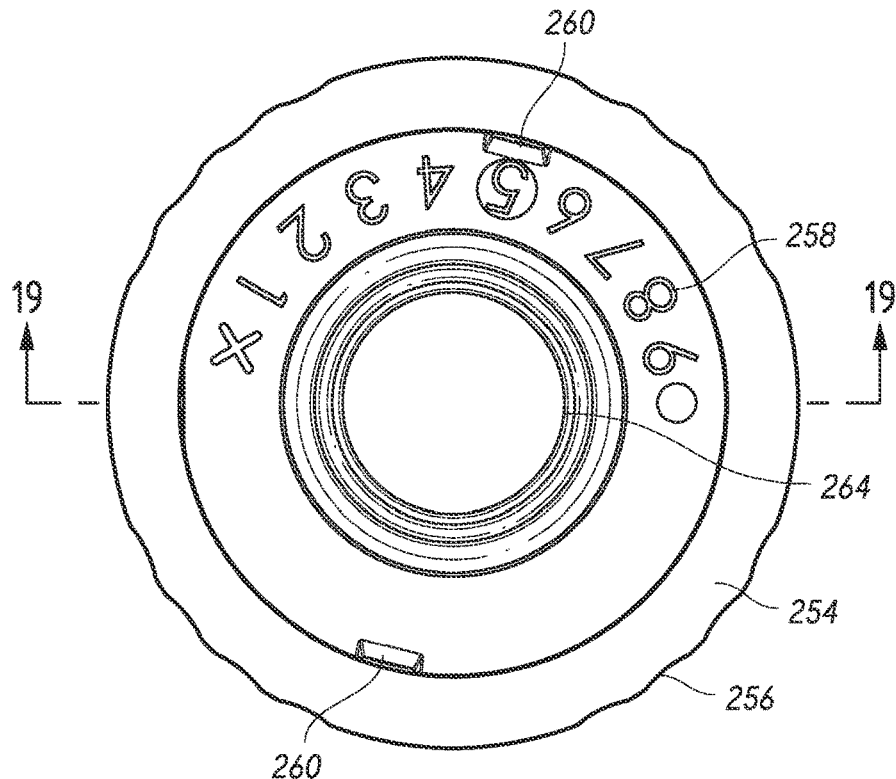
FIG. 18 is a top view of the example cartridge cap base of FIG. 17.
Figure 19:
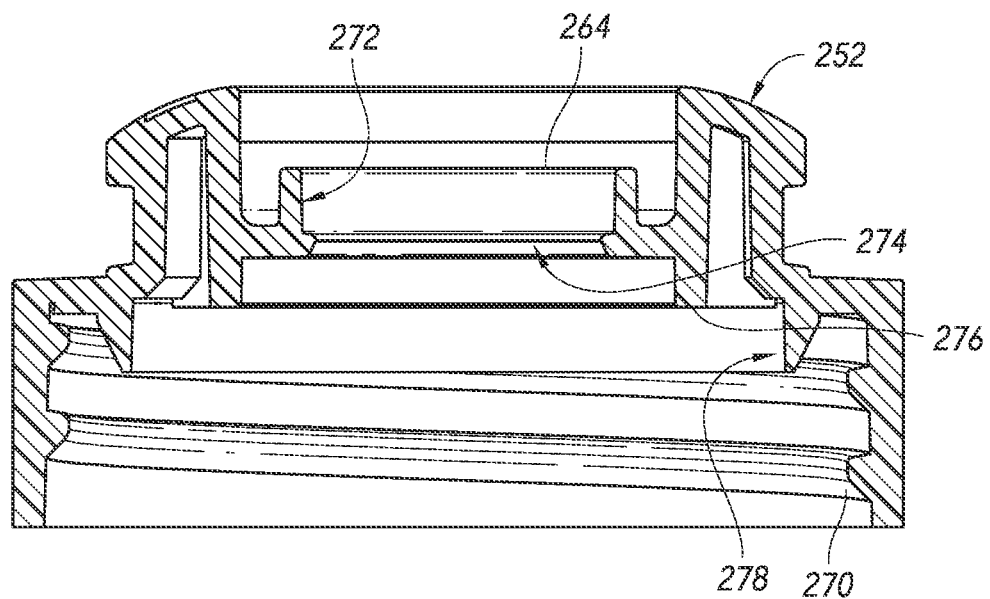
FIG. 19 is a sectional view in plane A-A of FIG. 18.
Figure 20:
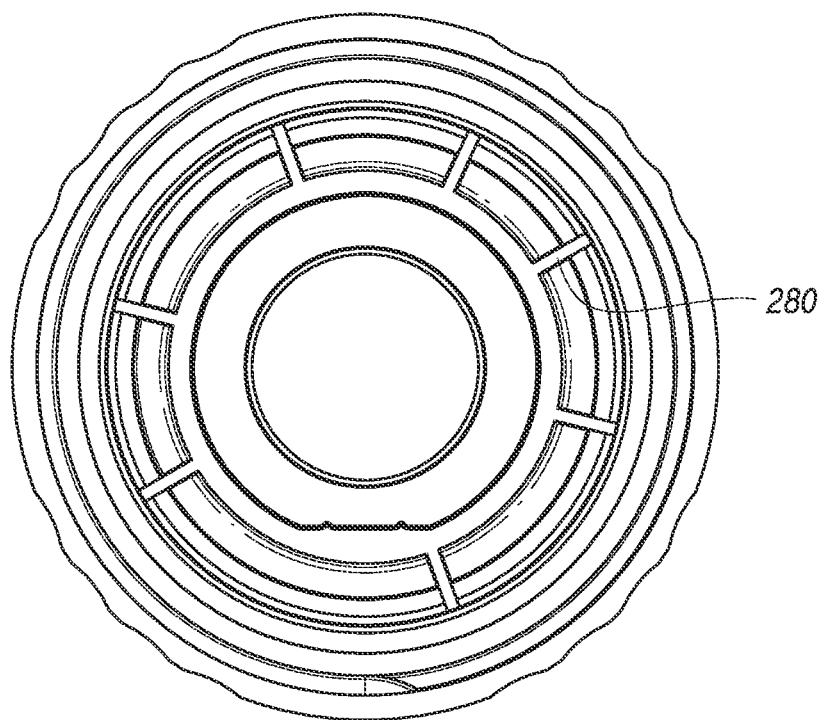
FIG. 20 is a bottom view of the example cartridge cap base of FIG. 17.

FIGS. 14-16 illustrate details of an example mixing nozzle 350 according to an aspect of the disclosure. Mixing nozzle 350 may include a generally cylindrical main body portion 352, having a flattened area 353 to facilitate proper orientation and alignment within a complementarily shaped recess in cap base 250 during assembly. Extending upward from main body portion 352 is a generally circular, raised snap-fit projection 354, including a rounded edge for permitting a sealing and snap fit engagement with a mating portion of the cartridge cap base 250 (FIGS. 2-4 and FIG. 24). A plurality, in this case four, base fluid ports 358 are defined in the mixing nozzle 350 to permit flow of base fluid and at least partially define a base fluid flow path through the mixing nozzle 350 and cartridge 100. A mixing nozzle stem 360 extends upward from the snap-fit projection 354 and includes integral threads 362 on an exterior surface thereof. Mixing nozzle stem 360 defines at least a portion of an additive flow path by way of an internal mixing nozzle additive flow passage 363. A seal retaining ring 364 is formed on a lower portion of mixing nozzle spout 360 for securing an internal end of annular one-way base fluid flow seal 320 (FIGS. 2-4 and FIG. 24) in place. As best seen in FIG. 16, additive flow passage 363 is defined in part by an upper conical interior surface 365 which is shaped complementarily to the conical projection on additive flow metering component 300 to define an adjustable metering zone through which the additive flows. According to an aspect of the disclosure, the flow geometry of the example mixing nozzle 350 may include a lower conical surface 367 defining a first converging additive flow zone, a middle cylindrical or slightly expanding interior surface 369 defining a second flow zone extending to the upper conical surface 365 which defines in part a metering zone. Applicants have found that characteristics of this flow geometry provides advantageous flow and mixing of additive with base fluid. As described above, a detent channel 368 is defined by projections 366 and 368 (FIG. 14) on a lower portion of the stem 360 to provide for a positive locking interaction with metering component 300 when it is threaded onto the metering nozzle in an initial assembly operation to provide a food safety grade seal. A number of reservoir spout retaining arms 374 having snap-fit projections 372 formed on an end thereof may be formed on a lower portion of the mixing nozzle to secure an upper end of the reservoir spout within the cartridge assembly (see FIG. 24). A lower annular wall 378 provides a channel 380 for receiving an end of the reservoir spout for additional sealing engagement. As will be recognized, the example mixing nozzle 350 defines a base fluid flow path, represented by arrows "B" in FIGS. 16 and 24, and an additive flow path represented by arrows "A" in FIGS. 16 and 24, it being recognized that the sectional view in FIG. 16 shows the ports 358 in dotted (hidden) lines. More particularly, the additive flow path is defined by a centrally or axially located passage, while the base fluid flow path includes passages that are disposed outward from the central location at least partially surrounding the additive fluid flow path. This flow geometry provides advantageous mixing and flow characteristics.

FIGS. 17-20 illustrate details of an example cartridge cap base 250 according to aspects of the disclosure. Base cap 250 includes a generally cylindrical internally threaded base portion 254 and a generally annular raised indicator portion 252 having a contoured upper surface with indicia 258 for indicating an additive mixing level to a user. The position of the indicia 258 is such that a selected indicia appears within the window in additive flow adjustment actuator. Indicator portion 252 fits within a channel formed in the underside of additive flow adjustment actuator 200 (see FIG. 24). Cap base includes an annular seat 272 for an outer edge of base flow one-way valve is 320 and an annular snap-fit ridge 274 for retaining the mixing nozzle 300 (see FIG. 24). Cap base includes an annular recess with a flat area (FIG. 20) for ensuring that the mixing nozzle is installed with correct orientation relative to the cap base. A number of ribs extend radially inward for supporting an annular wall.

Figure 21:
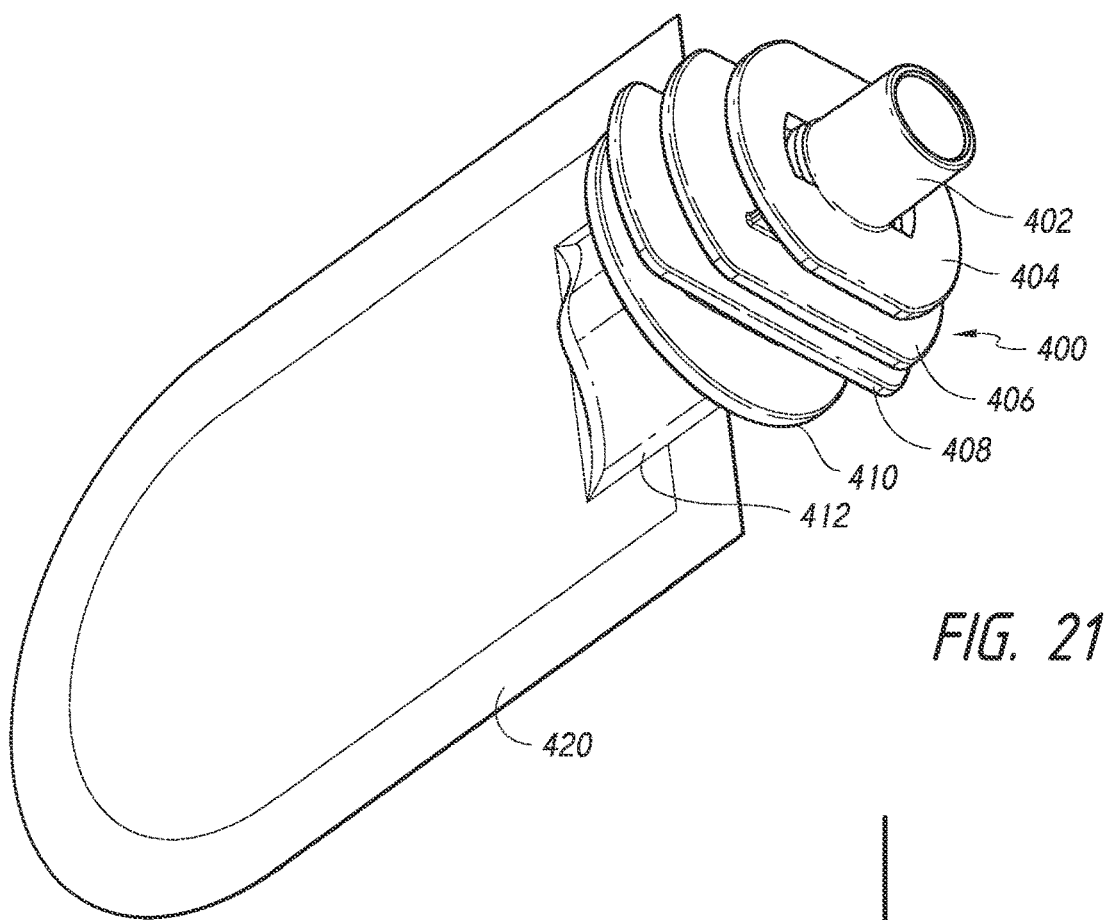
FIG. 21 is a perspective view of an example flexible pouch reservoir and pouch reservoir spout according to an aspect of the disclosure.
Figure 22:
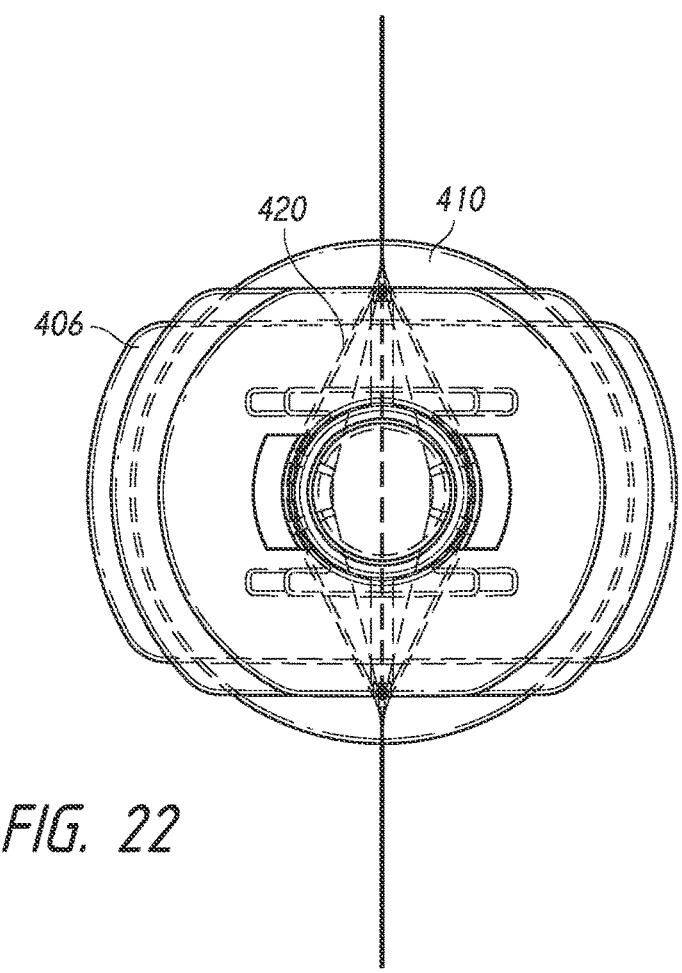
FIG. 22 is a top view of the flexible pouch reservoir and pouch reservoir spout of FIG. 21.
Figure 23:
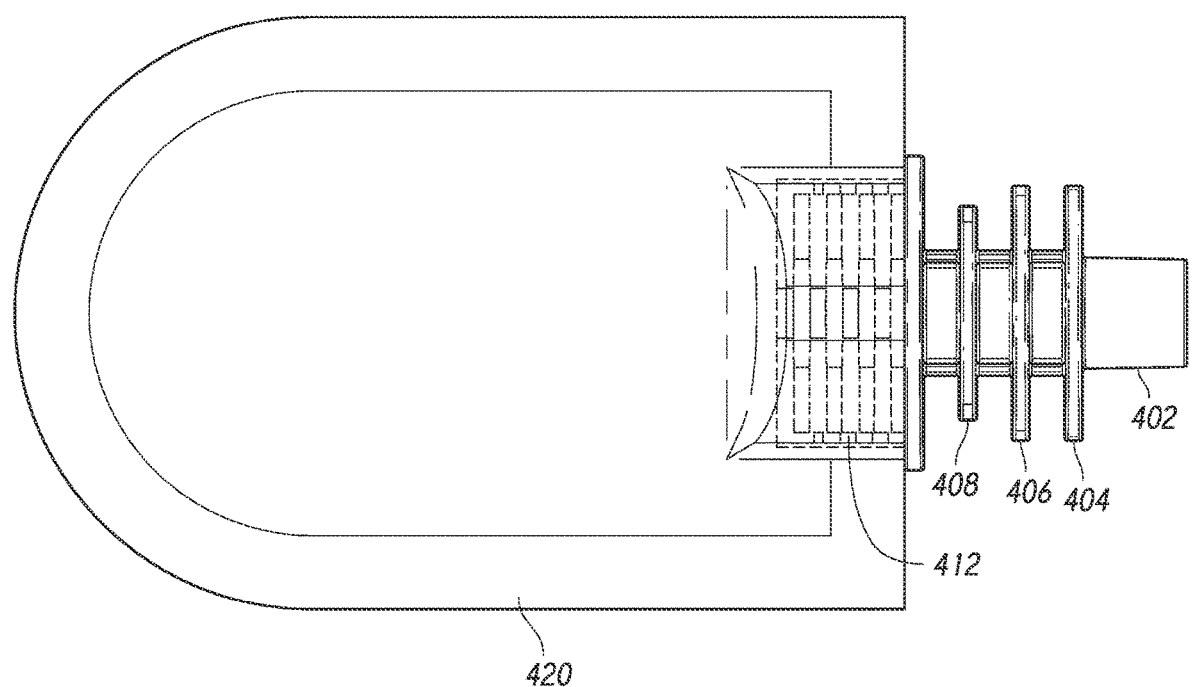
FIG. 23 is a side view of the flexible pouch reservoir and pouch reservoir spout of FIG. 21.

FIGS. 21-23 illustrate details of a flexible pouch reservoir and pouch reservoir spout according to an aspect of the disclosure. Spout 400 may include a stem portion 402 defining an interior additive flow passage. A first flange 404 may be provided with slots for receiving the reservoir retaining arms 374 of the mixing nozzle 300. A snap fit ridge or ring (FIG. 24) is formed on a lower portion of the stem 402 and cooperates with an internal ridge on a lower portion of the mixing nozzle. A second and third flange 406 and 408 extend from the stem 402 for use by automated filling equipment. The series of flanges on the spout may also be utilized in a cartridge assembly operation where the housing 500 is snap-fit on a first of the flanges during a first assembly operation, and then moved upward to snap fit onto a next higher flange in a second assembly operation. The flanges may also provide additional sealing interfaces with corresponding ridges defined on the housing interior. which the reservoir is filled with automated equipment. A bottom flange 410 provides a snap fit within housing or cage 50. The pouch reservoir is shown in a flat, unfilled state in FIGS. 21-23. As will be recognized, when filled with additive, pouch may assume a cylindrical shape and fit within housing 500. The pouch may be fastened by heat welding or other fastening techniques to a fastening adapter portion 412 of the reservoir spout 400 to seal the pouch walls to the pouch reservoir spout 400.

Figure 24:
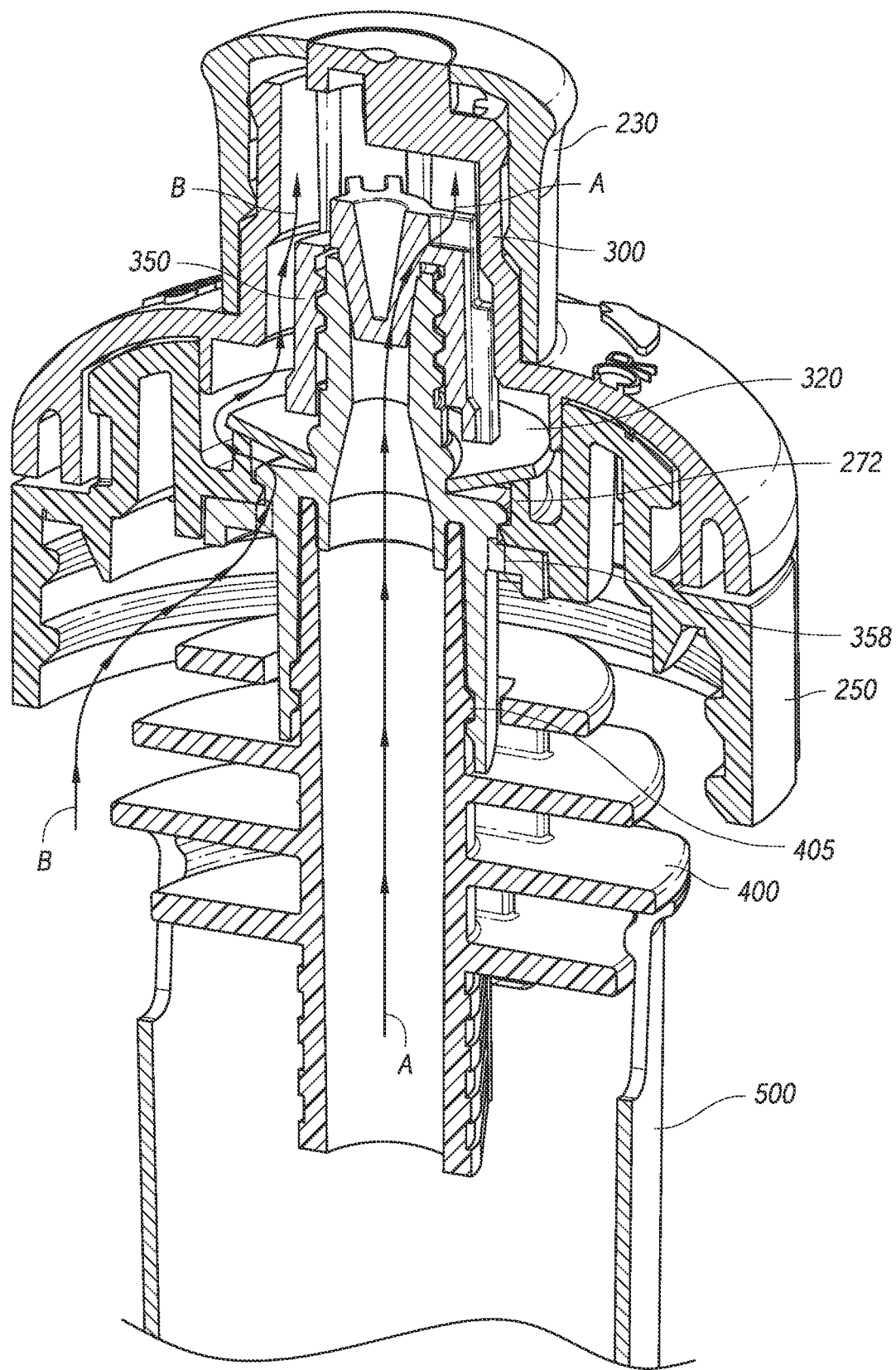
FIG. 24 is a sectional view of an example assembled additive delivery system cartridge assembly according to an aspect of the disclosure.

FIG. 24 illustrates a cutaway of an assembled additive delivery system according to an aspect of the disclosure. In this figure, the additive metering valve is shown in a closed position. Generally, assembly may involve first inserting and snap-fitting the metering valve 350 in place on the cartridge cap base 250. In a next step, the one-way sealing valve 320 is placed onto the mixing nozzle 350 and fit over the retaining ridge and seated on outer annulus of the cap base. Next, the additive flow metering insert 300 is threaded onto the counterpart threads on mixing nozzle 350 and positioned in proper rotational orientation. Additive adjustment actuator 200 is then inserted onto the cartridge cap base in proper alignment with the additive flow metering insert. Additive adjustment actuator 200 is retained on cap base with retaining tabs 224 (FIGS. 7-9) and may rotate with respect to the cap base to enable selection of an additive level and associated position of metering component 300. Push-pull cap 230 may then be placed on the cartridge assembly. Pouch reservoir spout and pouch reservoir are then snap fit into the mixing nozzle lower portion.

In operation, the additive flow adjustment actuator may be rotated relative to the cap base 250. Such rotation also causes rotation of the metering insert 300 relative to the mixing nozzle 350, resulting in slight axial, i.e., upward or downward movement of the insert 300 by way of cooperating threads between the insert 300 and nozzle 350. Axial movement of the metering insert 300 results in a change of additive flow through the metering area between the conical portion of insert 300 and the corresponding surface on mixing nozzle 350. As base fluid flows into the cartridge assembly, resulting from pressure changes within the base fluid container, i.e., from squeezing of a flexible bottle and or by suction applied by a user during consumption, and/or inverting or tipping, such action results in flow of additive and base fluid is mixed with additive at the appropriate level determined by the rotational position of the additive flow adjustment actuator. The additive flow path is illustrated by arrows "A", it being recognized that because the metering element 300 is in a fully closed position in this figure, the arrows "A" are adjacent where flow would occur in the metering section in this figure. The base fluid flow path is generally illustrated by arrows "B", it being recognized that flow will occur at the interface of the sealing element 320 and annular seat 272 of cap base 250, rather than the exact location of arrows "B" near that area.

Figure 25:
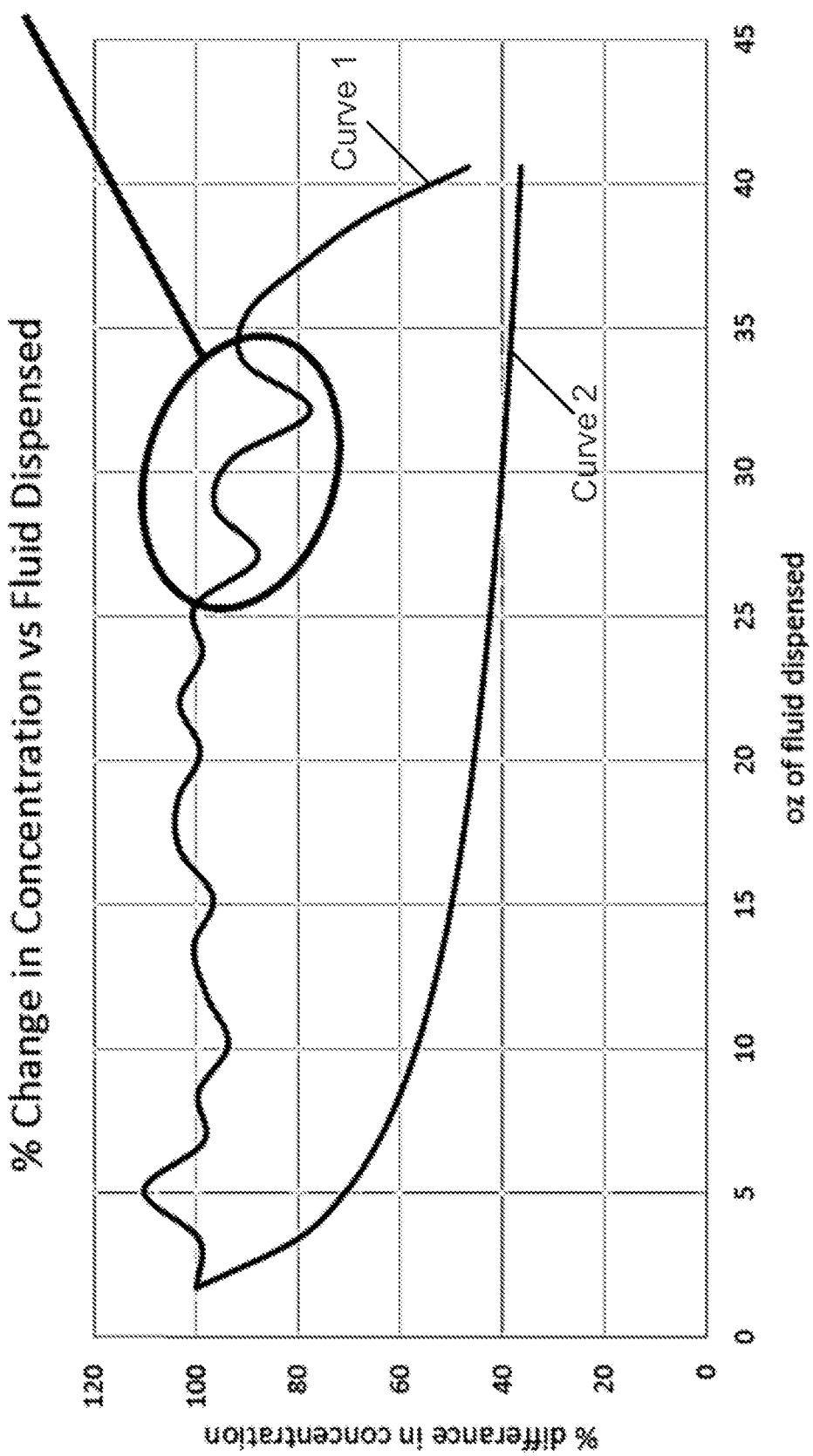
FIG. 25 is an example dilution/concentration variance curve that may be achieved with example cartridge systems according to an aspect of the disclosure.

FIG. 25 illustrates an example change in concentration variance with amount of fluid dispensed achieved with flexible reservoirs such as those described herein. Curve 1 represents a somewhat inconsistent additive concentration as fluid is depleted. Such inconsistent concentration is characteristic of rigid reservoirs. Curve 2 represents a relatively consistent change in concentration as fluid is dispensed as is attainable with flexible pouch reservoirs according to aspects of the disclosure. The disclosure also contemplates rigid or semi-rigid reservoir structures which provide for prevention of vacuum as additive is dispensed therefrom.

The components described above may be made using injection molding or other known techniques using thermoplastics, such as food grade polypropylene or like materials. The disclosure also contemplates other materials, such as stainless steel or other food grade or non-food grade materials.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents. For example, while the metering function of the additive delivery system has been described using a conical metering component or element, other structures may be used, such as flow control elements that utilize gate or ball valve or other components that provide adjustment of the metering area and flow passage based on user movement of an actuator. In addition, while snap fittings have been described for components, it will be recognized that other fastening structure or techniques may be used, such as threaded or screw fittings, friction fittings, or adhesive or welding techniques.

What is claimed is:

1. A method of assembling an additive cartridge comprising:
   providing a cap base, the cap base being adapted to be secured to a base fluid container;
   arranging a mixing nozzle in a predetermined nozzle rotational position relative to the cap base, the predetermined nozzle rotational position being required for engagement of the mixing nozzle with the cap base;
   positioning an additive flow metering insert in a predetermined insert rotational position on the mixing nozzle, the additive flow metering insert defining an adjustable flow passage with the mixing nozzle, and the predetermined insert rotational position being required for engagement of the additive flow metering insert with the mixing nozzle; and
   securing an additive adjustment actuator to the cap base such that the additive adjustment actuator may be rotated relative to the cap base, and such that rotation of the additive adjustment actuator causes the flow metering insert to move relative to the mixing nozzle to thereby adjust the adjustable flow.

2. The method of claim 1 wherein arranging the mixing nozzle in the predetermined nozzle rotational position relative to the cap base comprises positioning a main body portion of the mixing nozzle in a complementarily-shaped recess in the cap base.

3. The method of claim 2, wherein positioning the main body portion of the mixing nozzle in the complementarily-shaped recess in the cap base comprises snap fitting the mixing nozzle to the cap base.

4. The method of claim 2, further comprising securing a reservoir assembly to the mixing nozzle.

5. The method of claim 1, further comprising securing a reservoir assembly to the cap base, wherein the reservoir assembly and mixing nozzle are positioned on opposite sides of the cap base.

6. The method of claim 1, wherein securing the additive adjustment actuator comprises covering the mixing nozzle with the additive adjustment actuator.

7. The method of claim 1, further comprising configuring the mixing nozzle and the additive flow metering insert to form a food grade seal.

8. The method of claim 1, further comprising securing a flexible reservoir to a reservoir spout to assemble a reservoir assembly.

9. The method of claim 1, further comprising adjusting a flow of additive mixed with base fluid.

10. The method of claim 1, further comprising covering the mixing nozzle with the additive adjustment actuator during the step of securing the additive adjustment actuator to the cap base.

11. The method of claim 1, wherein arranging the mixing nozzle includes positioning the mixing nozzle in a single rotational orientation relative to the cap base that is required to engage the mixing nozzle with the cap base.

12. The method of claim 11, further comprising threading the additive flow metering insert on the mixing nozzle.

13. The method of claim 12, further comprising forming a seal between the additive flow metering insert and the mixing nozzle.

14. The method of claim 13, further comprising locking the additive flow metering insert on the mixing nozzle with a detent channel on the mixing nozzle.

15. The method of claim 1, further comprising positioning the additive adjustment actuator in proper alignment with the mixing nozzle.

16. The method of claim 1, further comprising retaining the additive adjustment actuator on the cap base with at least one retaining tab.

17. The method of claim 1, further comprising installing a one-way seal on the mixing nozzle to form a one-way valve for base liquid ports on the mixing nozzle.

18. The method of claim 1, further comprising securing a reservoir assembly to the mixing nozzle with at least one reservoir retaining arm on the mixing nozzle.

19. The method of claim 1, wherein arranging the mixing valve includes extending a portion of the mixing valve through an opening of the cap base and rotationally positioning the mixing valve relative to the cap base about an axis that extends through the opening.

20. The method of claim 1, wherein positioning the additive flow metering insert includes rotating the additive flow metering insert about an axis about which the additive flow metering insert rotates to adjust the adjustable flow passage.

21. The method of claim 20, wherein arranging the mixing valve includes rotationally positioning the mixing valve about the axis relative to the cap base.

22. The method of claim 1, wherein the predetermined nozzle rotational position is a rotational position about an axis along which additive flows through the mixing nozzle.

* * * * *